United States Patent
Qiao et al.

(10) Patent No.: US 11,645,554 B2
(45) Date of Patent: May 9, 2023

(54) METHOD AND APPARATUS FOR RECOGNIZING A LOW-QUALITY ARTICLE BASED ON ARTIFICIAL INTELLIGENCE, DEVICE AND MEDIUM

(71) Applicant: BEIJING BAIDU NETCOM SCIENCE AND TECHNOLOGY CO., LTD., Haidian District Beijing (CN)

(72) Inventors: Chao Qiao, Beijing (CN); Bo Huang, Beijing (CN); Daren Li, Beijing (CN); Qiaoqiao She, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 740 days.

(21) Appl. No.: 16/013,162

(22) Filed: Jun. 20, 2018

(65) Prior Publication Data

US 2018/0365574 A1 Dec. 20, 2018

(30) Foreign Application Priority Data

Jun. 20, 2017 (CN) .......................... 201710469542.7

(51) Int. Cl.
*G06N 5/04* (2023.01)
*G06N 20/00* (2019.01)
(Continued)

(52) U.S. Cl.
CPC ............... *G06N 5/04* (2013.01); *G06N 7/01* (2023.01); *G06N 20/00* (2019.01); *G06N 20/20* (2019.01); *Y02D 10/00* (2018.01)

(58) Field of Classification Search
CPC .......... G06N 5/04; G06N 20/00; G06N 7/005; G06N 20/20
See application file for complete search history.

(56) References Cited

U.S. PATENT DOCUMENTS

| 2012/0331063 A1* | 12/2012 | Rajaram | ............... G06Q 50/01 709/206 |
| 2015/0074020 A1* | 3/2015 | Arpat | ...................... G06N 5/04 706/12 |
| 2017/0061286 A1* | 3/2017 | Kumar | ............... G06Q 30/0269 |

FOREIGN PATENT DOCUMENTS

CN 102298583 A 12/2011
CN 103324745 A 9/2013
(Continued)

OTHER PUBLICATIONS

Polikar, Robi, Ensemble Based Systems in Decision Making, IEEE Circuits and Systems Magazine, Third Quarter 2006, pp. 21-45 (Year: 2006).*
(Continued)

*Primary Examiner* — Li B. Zhen
*Assistant Examiner* — William Wai Yin Kwan
(74) *Attorney, Agent, or Firm* — Brooks Kushman P.C.

(57) ABSTRACT

A method and apparatus for recognizing a low-quality article based on artificial intelligence, a device and a medium. The method comprises: obtaining a user feedback behavior feature of a to-be-recognized article in a news-recommending system; according to the user feedback behavior feature of the to-be-recognized article and a predetermined low-quality article recognition model, recognizing whether the to-be-recognized article is a low-quality article. Automatically recognizing whether the to-be-recognized article is a low-quality article according to the user feedback behavior feature of the to-be-recognized article and the predetermined low-quality article recognition model, thereby overcoming the technical problem about consumption of time and effects and low recognition efficiency in manually checking whether the to-be-recognized article is a low-quality article in the prior art, not only substantially saving the time spent in recognizing whether the to-be-recognized article is the (Continued)

low-quality article, saving manpower consumed in recognition, improving the recognition efficiency of the low-quality article.

20 Claims, 10 Drawing Sheets

(51) Int. Cl.
*G06N 20/20* (2019.01)
*G06N 7/01* (2023.01)

(56) References Cited

FOREIGN PATENT DOCUMENTS

| | | |
|---|---|---|
| CN | 103810162 A | 5/2014 |
| CN | 105243087 A | 1/2016 |
| CN | 105282565 A | 1/2016 |
| CN | 106844632 A | 6/2017 |
| JP | 2011204226 A | 10/2011 |

OTHER PUBLICATIONS

Hensinger et al., Modelling and predicting news popularity, Pattern Analysis and Applications 16 (2013), DOI 10.1007/s10044-012-0314-6, pp. 623-635 (Year: 2013).*

Singh et al., An Approach towards feature specific opinion mining and sentimental analysis across e-commerce websites, 2014 5th International Conference—Confluence The Next Generation Information Technology Summit, Sep. 25-26, 2014, IEEE 2014, pp. 329-335 (Year: 2014).*

Chinese Office Action dated May 8, 2020, for related Chinese Appln. No. 201710469542.7; 4 Pages.

* cited by examiner

METHOD AND APPARATUS FOR RECOGNIZING A LOW-QUALITY ARTICLE BASED ON ARTIFICIAL INTELLIGENCE, DEVICE AND MEDIUM

The present application claims the priority of Chinese Patent Application No. 201710469542.7, filed on Jun. 20, 2017, with the title of "Method and apparatus for recognizing a low-quality article based on artificial intelligence, device and medium". The disclosure of the above applications is incorporated herein by reference in its entirety.

FIELD OF THE DISCLOSURE

The present disclosure relates to the technical field of computer application, and particularly to a method and apparatus for recognizing a low-quality article based on artificial intelligence, a device and a medium.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a type of new intelligent machines capable of responding in a manner similar to human intelligence. The studies in the field comprise robots, language recognition, image recognition, natural language processing, expert systems and the like.

As mobile Internet technologies develop and the use of mobile terminals prevail, many news-recommending systems spring up in the market to enable a user to browse various latest news resources in time through a mobile terminal. The news-recommending system may learn about the user's interest according to the user's self-portrait, and thereby recommend articles of the user's interest to the user purposefully according to the user's interest. However, in the prior art, articles included in the news-recommending system are of different quality, they might include some authoritative high-quality articles, or some crude and fake news, or some low-quality articles which are intended to attract the user's attention and contravene facts. To prevent low-quality articles from continuing to pollute network resources in the network environment, all articles included in an article repository of the news-recommending system are manually checked to recognize low-quality articles and perform shielding or other processing.

However, manually checking all articles in the article repository of the news-recommending system in the prior art causes the recognition procedure of low-quality articles to be time-consuming and arduous, and causes a very low low-quality article recognition efficiency.

SUMMARY OF THE DISCLOSURE

The present disclosure provides a method and apparatus for recognizing a low-quality article based on artificial intelligence, a device and a medium, to improve the efficiency of recognizing low-quality articles.

The present disclosure provides a method for recognizing a low-quality article based on artificial intelligence, the method comprising:

obtaining a user feedback behavior feature of a to-be-recognized article in a news-recommending system;

according to the user feedback behavior feature of the to-be-recognized article and a predetermined low-quality article recognition model, recognizing whether the to-be-recognized article is a low-quality article.

Further optionally, the method further comprises:

obtaining a feature of the to-be-recognized article in the news-recommending system;

correspondingly, the step of, according to the user feedback behavior feature of the to-be-recognized article and a predetermined low-quality article recognition model, recognizing whether the to-be-recognized article is a low-quality article specifically further comprises:

recognizing whether the to-be-recognized article is a low-quality article, according to the user feedback behavior feature of the to-be-recognized article and the predetermined low-quality article recognition model, and in combination with the feature of the to-be-recognized article.

Further optionally, in the method as described above, before the step of, according to the user feedback behavior feature of the to-be-recognized article and a predetermined low-quality article recognition model, recognizing whether the to-be-recognized article is a low-quality article, the method further comprises:

collecting user feedback behavior features corresponding to respective training articles in several training articles whose known class is a low-quality article or a non-low-quality article, as training data to obtain several training data;

training the low-quality article recognition model according to the several training data.

Further optionally, in the method, each training data further comprises a feature of a corresponding training article.

Further optionally, in the method, if the user feedback behavior feature of the to-be-recognized article comprises the user's comments, and the low-quality article recognition model comprises a first classifier model, the step of recognizing whether the to-be-recognized article is a low-quality article according to the user feedback behavior feature and the predetermined low-quality article recognition model specifically comprises:

according to the user's comments on the to-be-recognized article and a pre-trained primary low-quality article recognition model, performing a primary prediction about whether the to-be-recognized article is the low-quality article, to obtain a primary prediction result;

performing word-segmenting processing for the user's comments on the to-be-recognized article;

detecting situations that segmented words obtained from the word segmenting processing hit subject feature words in a pre-collected subject feature word repository, to obtain a subject feature word expression of the user's comments on the to-be-recognized article; the subject feature words each being a commenting subject which is pre-collected and used to comment on the low-quality article;

detecting situations that segmented words obtained from the word segmenting processing hit commentary content feature words in a pre-collected commentary content feature word dictionary, to obtain a commentary content feature word expression of the user's comments on the to-be-recognized article, the commentary content feature words each being a word which is pre-collected and used to comment on the low-quality article;

inputting the primary prediction result, the subject feature word expression and the commentary content feature word expression into the pre-trained first classifier model, so that the first classifier model predicts whether the to-be-recognized article is the low-quality article.

Further optionally, in the method as described above, the training the low-quality article recognition model according to the several training data specifically comprises:

obtaining users' comments on respective training articles, from user feedback behavior features of training articles of said several training data;

regarding users' comments on respective training articles, inputting corresponding users' comments into a pre-trained primary low-quality article recognition model, so that the primary low-quality article recognition model outputs a primary prediction result of whether a corresponding training article is the low-quality article;

regarding the users' comments on each training article, obtaining a subject feature word expression corresponding to the users' comments on the corresponding training article, according to the subject feature word repository;

regarding the user's comment on each training article, obtaining a commentary content feature word expression corresponding to the users' comments on the corresponding training article, according to the commentary content feature word dictionary;

training the first classifier model by using the primary prediction results, the subject feature word expressions and the commentary content feature word expressions corresponding to the users' comments on respective training articles, and known classes of respective training articles.

Further optionally, in the method as described above, before the step of, regarding users' comments on respective training articles, inputting corresponding users' comments into a pre-trained primary low-quality article recognition model, so that the primary low-quality article recognition model outputs a primary prediction result of whether a corresponding training article is the low-quality article, the method further comprises:

using users' comments corresponding to respective training articles and known classes of respective training articles, to train the primary low-quality article recognition model;

the using users' comments corresponding to respective training articles and known classes of respective training articles, to train the primary low-quality article recognition model specifically comprises:

inputting users' comments corresponding to respective training articles in turn into the primary low-quality article recognition model, so that the primary low-quality article recognition model predicts a predicted class of a corresponding training article; judging whether the predicted class of the training article is consistent with the known class; in case of inconsistency, adjusting parameters of the primary low-quality article recognition model so that the predicted class of the training article as predicted by the primary low-quality article recognition model tends to be consistent with the known class; according to the above steps, repeatedly using users' comments on respective training articles to train the primary low-quality article recognition model until the primary low-quality article recognition model converges; determining parameters of the primary low-quality article recognition model and thereby determining the primary low-quality article recognition model.

Further optionally, in the method, if the user feedback behavior feature of the to-be-recognized article includes clicking and opening times and times of clicking dislikes, and the feature of the to-be-recognized article includes displaying times, and the low-quality article recognition model includes a second classifier model, the step of recognizing whether the to-be-recognized article is a low-quality article, according to the user feedback behavior feature and the predetermined low-quality article recognition model, and in combination with the feature of the to-be-recognized article, specifically comprises:

inputting the clicking and opening times, the times of clicking dislike and the displaying times of the to-be-recognized article into the pre-trained second classifier model, so that the second classifier model predicts whether the to-be-recognized article is the low-quality article.

Further optionally, in the method, the training the low-quality article recognition model according to the several training data specifically comprises:

obtaining the clicking and opening times and the times of clicking dislikes of respective training articles, from user feedback behavior features of respective training articles of said several training data; obtaining the displaying times of respective training articles from features of respective training articles of said several training data;

training the second classifier model by using the clicking and opening times, the times of clicking dislike, the displaying times and known classes of respective training articles.

Further optionally, in the method as described above, if the user feedback behavior feature of the to-be-recognized article includes a reading progress and a reading duration, the feature of the to-be-recognized article includes a length of the to-be-recognized article and the number of included pictures, and the low-quality article recognition model includes a third classifier model, the step of recognizing whether the to-be-recognized article is a low-quality article, according to the user feedback behavior feature and the predetermined low-quality article recognition model, and in combination with the feature of the to-be-recognized article, specifically comprises:

inputting the reading progress and the reading duration of the to-be-recognized article, the length of the to-be-recognized article and the number of included pictures, into the pre-trained third classifier model, so that the third classifier model predicts whether the to-be-recognized article is the low-quality article.

Further optionally, in the method, the training the low-quality article recognition model according to the several training data specifically comprises:

obtaining the reading progress and reading duration of respective training articles, from user feedback behavior features of respective training articles of said several training data; obtaining the length of the respective training articles and the number of included pictures, from features of respective training articles of said several training data;

training the third classifier model by using the reading progress, reading duration, length and the number of included pictures of the respective training articles, and known classes of the respective training articles.

Further optionally, in the method, if the user feedback behavior feature of the to-be-recognized article includes times of storing in favorites and sharing times, the feature of the to-be-recognized article includes times of displaying the to-be-recognized article, and the low-quality article recognition model includes a fourth classifier model, the step of recognizing whether the to-be-recognized article is a low-quality article, according to the user feedback behavior feature and the predetermined low-quality article recognition model, and in combination with the feature of the to-be-recognized article, specifically comprises:

inputting the times of storing in favorites, the sharing times and the displaying times of the to-be-recognized article, into the pre-trained fourth classifier model, so that the fourth classifier model predicts whether the to-be-recognized article is the low-quality article.

Further optionally, in the method, the training the low-quality article recognition model according to the several training data specifically comprises:

obtaining the times of storing in favorites and the sharing times of the respective training articles, from user feedback behavior features of respective training articles of said several training data; obtaining the displaying times of the respective training articles, from features of respective training articles of said several training data;

training the fourth classifier model by using the times of storing in favorites, the sharing times and the displaying times of the respective training articles, and known classes of the respective training articles.

Further optionally, in the method as described above, if the low-quality article recognition model includes at least two pre-trained classifier models, the step of recognizing whether the to-be-recognized article is a low-quality article, according to the user feedback behavior feature and the predetermined low-quality article recognition model, and in combination with the feature of the to-be-recognized article, specifically comprises:

obtaining the classifier models' prediction results about whether the to-be-recognized article is the low-quality article, according to the user feedback behavior feature of the to-be-recognized article, or the user feedback behavior feature of the to-be-recognized article and the feature of the to-be-recognized article, and in combination with the pre-trained classifier models;

predicting whether the to-be-recognized article is the low-quality article, according to the classifier models' prediction results about whether the to-be-recognized article is the low-quality article, and predetermined weights of respective classifier models.

Further optionally, in the method as described, before predicting whether the to-be-recognized article is the low-quality article, according to the classifier models' prediction results about whether the to-be-recognized article is the low-quality article, and predetermined weights of respective classifier models, the method further comprises:

receiving weights of respective classifier models set by the user.

Further optionally, in the method as described above, the training the low-quality article recognition model according to the several training data specifically comprises:

upon performing the first round of training, according to a sampling probability of respective training data, sampling from a training data set D comprised of collected several training data to obtain a training data subset D', D' being a subset of D; an initial sampling probability of the respective training data upon the first round of training being the same;

using respective training data in the training data subset D' to train a plurality of pre-selected classifier models respectively;

according to results of training the plurality of pre-selected classifier models, calculating a training error of the respective classifier models upon the first round of training;

according to the training error of each of said classifier models, obtaining a classifier model with a minimum training error as the first round of classifier model selected by this round of training;

according to the training error of the first round of classifier model, setting a weight of the first round of classifier model;

according to training results of the first round of classifier model for the respective training data in the training data subset, updating a sampling probability of respective training data in the training data subset, so that the sampling probability of training data with a wrong prediction result upon this round of training increases, whereas the sampling probability of the training data with a correct prediction result reduces;

repeatedly performing the above steps, and performing the second to $N^{th}$ round of training, to respectively obtain the second round of classifier model, . . . the $N^{th}$ round of classifier model, and weights of respective rounds of classifier models.

The present disclosure provides an apparatus for recognizing a low-quality article based on artificial intelligence, the apparatus comprising:

a feature obtaining module configured to obtain a user feedback behavior feature of a to-be-recognized article in a news-recommending system;

a recognition module configured to, according to the user feedback behavior feature of the to-be-recognized article and a predetermined low-quality article recognition model, recognize whether the to-be-recognized article is a low-quality article.

Further optionally, in the apparatus as described above, the feature obtaining module is configured to obtain a feature of the to-be-recognized article in the news-recommending system;

the recognition module is specifically configured to recognize whether the to-be-recognized article is a low-quality article, according to the user feedback behavior feature of the to-be-recognized article and the predetermined low-quality article recognition model, and in combination with the feature of the to-be-recognized article.

Further optionally, the apparatus as described above further comprises:

a collecting module configured to collect user feedback behavior features corresponding to respective training articles in several training articles whose known class is a low-quality article or a non-low-quality article, as training data to obtain several training data;

a training module configured to, according to the several training data, train the low-quality article recognition model.

Further optionally, in the apparatus as described above, each training data further comprises a feature of a corresponding training article.

Further optionally, in the apparatus as described above, if the user feedback behavior feature of the to-be-recognized article comprises the user's comments, and the low-quality article recognition model comprises a first classifier mode, the recognition module is specifically configured to:

according to the user's comments on the to-be-recognized article and a pre-trained primary low-quality article recognition model, perform a primary prediction about whether the to-be-recognized article is the low-quality article, to obtain a primary prediction result;

perform word-segmenting processing for the user's comments on the to-be-recognized article;

detect situations that segmented words obtained from the word segmenting processing hit subject feature words in a pre-collected subject feature word repository, to obtain a subject feature word expression of the user's comments on the to-be-recognized article; the subject feature words each being a commenting subject which is pre-collected and used to comment on the low-quality article;

detect situations that segmented words obtained from the word segmenting processing hit commentary content feature words in a pre-collected commentary content feature word dictionary, to obtain a commentary content feature word expression of the user's comments on the to-be-recognized article, the commentary content feature words each being a word which is pre-collected and used to comment on the low-quality article;

input the primary prediction result, the subject feature word expression and the commentary content feature word expression into a pre-trained first classifier model, so that the first classifier model predicts whether the to-be-recognized article is the low-quality article.

Further optionally, in the apparatus as described above, the training module is specifically configured to:

obtain users' comments on respective training articles, from user feedback behavior features of training articles of said several training data;

regarding users' comments on respective training articles, input corresponding users' comments into a pre-trained primary low-quality article recognition model, so that the primary low-quality article recognition model outputs a primary prediction result of whether a corresponding training article is the low-quality article;

regarding the users' comments on each training article, obtain a subject feature word expression corresponding to the users' comments on the corresponding training article, according to the subject feature word repository;

regarding the user's comment on each training article, obtain a commentary content feature word expression corresponding to the users' comments on the corresponding training article, according to the commentary content feature word dictionary;

train the first classifier model by using the primary prediction results, the subject feature word expressions and the commentary content feature word expressions corresponding to the users' comments on respective training articles, and known classes of respective training articles.

Further optionally, in the apparatus as described above, the training module is further configured to use users' comments corresponding to respective training articles and known classes of respective training articles, to train the primary low-quality article recognition model;

the training module is specifically configured to input users' comments corresponding to respective training articles in turn into the primary low-quality article recognition model, so that the primary low-quality article recognition model predicts a predicted class of a corresponding training article; judge whether the predicted class of the training article is consistent with the known class; in case of inconsistency, adjust parameters of the primary low-quality article recognition model so that the predicted class of the training article as predicted by the primary low-quality article recognition model tends to be consistent with the known class; according to the above steps, repeatedly use users' comments on respective training articles to train the primary low-quality article recognition model until the primary low-quality article recognition model converges; determine parameters of the primary low-quality article recognition model and thereby determine the primary low-quality article recognition model.

Further optionally, in the apparatus as described above, if the user feedback behavior feature of the to-be-recognized article includes clicking and opening times and times of clicking dislikes, and the feature of the to-be-recognized article includes displaying times, and the low-quality article recognition model includes a second classifier model, the recognition module is specifically configured to input the clicking and opening times, the times of clicking dislike and the displaying times of the to-be-recognized article into the pre-trained second classifier model, so that the second classifier model predicts whether the to-be-recognized article is the low-quality article.

Further optionally, in the apparatus as described above, the training module is specifically configured to:

obtain the clicking and opening times and the times of clicking dislikes of respective training articles, from user feedback behavior features of respective training articles of said several training data; obtain the displaying times of respective training articles from features of respective training articles of said several training data;

train the second classifier model by using the clicking and opening times, the times of clicking dislike, the displaying times and known classes of respective training articles.

Further optionally, in the apparatus as described above, if the user feedback behavior feature of the to-be-recognized article includes a reading progress and a reading duration, the feature of the to-be-recognized article includes a length of the to-be-recognized article and the number of included pictures, and the low-quality article recognition model includes a third classifier model, the recognition module is specifically configured to input the reading progress and the reading duration of the to-be-recognized article, the length of the to-be-recognized article and the number of included pictures, into the pre-trained third classifier model, so that the third classifier model predicts whether the to-be-recognized article is the low-quality article.

Further optionally, in the apparatus as described above, the training module is specifically configured to:

obtain the reading progress and reading duration of respective training articles, from user feedback behavior features of respective training articles of said several training data; obtain the length of the respective training articles and the number of included pictures, from features of respective training articles of said several training data;

train the third classifier model by using the reading progress, reading duration, length and the number of included pictures of the respective training articles, and known classes of the respective training articles.

Further optionally, in the apparatus as described above, if the user feedback behavior feature of the to-be-recognized article includes times of storing in favorites and sharing times, the feature of the to-be-recognized article includes times of displaying the to-be-recognized article, and the low-quality article recognition model includes a fourth classifier model, the recognition module is specifically configured to input the times of storing in favorites, the sharing times and the displaying times of the to-be-recognized article, into the pre-trained fourth classifier model, so that the fourth classifier model predicts whether the to-be-recognized article is the low-quality article.

Further optionally, in the apparatus as described above, the training module is specifically configured to:

obtain the times of storing in favorites and the sharing times of the respective training articles, from user feedback behavior features of respective training articles of said several training data; obtain the displaying times of the respective training articles, from features of respective training articles of said several training data;

train the fourth classifier model by using the times of storing in favorites, the sharing times and the displaying times of the respective training articles, and known classes of the respective training articles.

Further optionally, in the apparatus as described above, if the low-quality article recognition model includes at least two pre-trained classifier models, the recognition module is specifically configured to:

obtain the classifier models' prediction results about whether the to-be-recognized article is the low-quality article, according to the user feedback behavior feature of the to-be-recognized article, or the user feedback behavior feature of the to-be-recognized article and the feature of the to-be-recognized article, and in combination with the pre-trained classifier models;

predict whether the to-be-recognized article is the low-quality article, according to the classifier models' prediction results about whether the to-be-recognized article is the low-quality article, and predetermined weights of respective classifier models.

Optionally, the apparatus as described above further comprises:

a receiving module configured to receive weights of respective classifier models set by the user.

Further optionally, in the apparatus, the training module is specifically configured to:

upon performing the first round of training, according to a sampling probability of respective training data, sample from a training data set D comprised of collected several training data to obtain a training data subset D', D' being a subset of D; an initial sampling probability of the respective training data upon the first round of training being the same;

use respective training data in the training data subset D' to train a plurality of pre-selected classifier models respectively;

according to results of training the plurality of pre-selected classifier models, calculate a training error of the respective classifier models upon the first round of training;

according to the training error of each of said classifier models, obtain a classifier model with a minimum training error as the first round of classifier model selected by this round of training;

according to the training error of the first round of classifier model, set a weight of the first round of classifier model;

according to training results of the first round of classifier model for the respective training data in the training data subset, update a sampling probability of respective training data in the training data subset, so that the sampling probability of training data with a wrong prediction result upon this round of training increases, whereas the sampling probability of the training data with a correct prediction result reduces;

repeatedly perform the above steps, and perform the second to $N^{th}$ round of training, to respectively obtain the second round of classifier model, . . . the $N^{th}$ round of classifier model, and weights of respective rounds of classifier models.

The present disclosure further provides a computer device, comprising:

one or more processors, a memory for storing one or more programs, the one or more programs, when executed by said one or more processors, enable said one or more processors to implement the above-mentioned method for recognizing a low-quality article based on artificial intelligence.

The present disclosure further provides a computer readable medium on which a computer program is stored, the program, when executed by the processor, implementing the above-mentioned method for recognizing a low-quality article based on artificial intelligence.

According to the method and apparatus for recognizing a low-quality article based on artificial intelligence, the device and the medium of the present disclosure, it is feasible to obtain the user feedback behavior feature of the to-be-recognized article in the news-recommending system; and, according to the user feedback behavior feature of the to-be-recognized article and the predetermined low-quality article recognition model, recognize whether the to-be-recognized article is a low-quality article. According to the technical solution of the present embodiment, it is possible to automatically recognize whether the to-be-recognized article is a low-quality article according to the user feedback behavior feature of the to-be-recognized article and the predetermined low-quality article recognition model, thereby overcoming the technical problem about consumption of time and effects and low recognition efficiency in manually checking whether the to-be-recognized article is a low-quality article in the prior art, not only substantially saving the time spent in recognizing whether the to-be-recognized article is the low-quality article, but also effectively saving manpower costs consumed in recognition, thereby greatly improving the recognition efficiency of the low-quality article.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
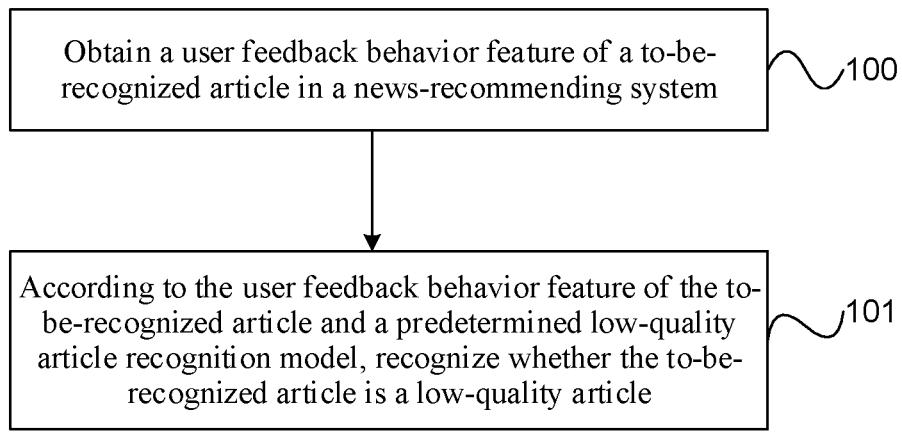
FIG. 1 is a flow chart of a first embodiment of a method for recognizing a low-quality article based on artificial intelligence according to the present disclosure.

FIG. 1 is a flow chart of a first embodiment of a method for recognizing a low-quality article based on artificial intelligence according to the present disclosure. As shown in FIG. 1, the method for recognizing a low-quality article based on artificial intelligence according to the present embodiment may specifically include the following steps:

100: obtaining a user feedback behavior feature of a to-be-recognized article in a news-recommending system;

101: according to the user feedback behavior feature of the to-be-recognized article and a predetermined low-quality article recognition model, recognizing whether the to-be-recognized article is a low-quality article.

A subject for executing the method for recognizing a low-quality article based on artificial intelligence according to the present embodiment is an apparatus for recognizing a low-quality article based on artificial intelligence. The apparatus for recognizing a low-quality article based on artificial intelligence may be an independent electronic device, or a device which is integrated with software and runs on other hardware devices.

In the news-recommending system, the user's feedback information for the news resources is very important. Particularly in recognition of low-quality resources, the user's feedback behavior can directly reflect the truest user experience, and is important reference for judging whether the news resources are of low quality. Meanwhile, as compared with purely using the content of news itself to comment on article quality, using the user's feedback behavior for the news resources can solve some problems that are difficult to find from the content of news itself. For example, regarding fake news, without using background knowledge, it is very difficult to judge whether one piece of news is fake news from the content of the news. However, using the user's feedback behavior may solve such problems from a posterior view angle.

In practical application, the user's feedback behaviors may be classified into an explicit type and an implicit type, wherein the explicit feedback behaviors comprise: the user's comment and click of dislike; the implicit feedback behaviors comprise: click and open, reading duration, click and review the original article, storage in favorites and sharing situations and so on. In the present embodiment, the user's many types of feedback behaviors for news resources are used to recognize low-quality news resources, to overcome the technical problem about the low recognition efficiency of the low-quality articles in the manual check manner in the prior art.

Specifically, in the present embodiment, it is feasible to obtain a user feedback behavior feature of a to-be-recognized article in a news-recommending system, and then input the user feedback behavior feature of the to-be-recognized article into a predetermined low-quality article recognition model, wherein the predetermined low-quality article recognition model may predict whether the to-be-recognized article is a low-quality article, thereby recognizing whether the to-be-recognized article is the low-quality article.

According to the method for recognizing a low-quality article based on artificial intelligence according to the present embodiment, it is feasible to obtain a user feedback behavior feature of the to-be-recognized article in the news-recommending system; according to the user feedback behavior feature of the to-be-recognized article and the predetermined low-quality article recognition model, recognize whether the to-be-recognized article is a low-quality article. According to the technical solution of the present embodiment, it is possible to automatically recognize whether the to-be-recognized article is a low-quality article according to the user feedback behavior feature of the to-be-recognized article and the predetermined low-quality article recognition model, thereby overcoming the technical problem about consumption of time and effects and low recognition efficiency in manually checking whether the to-be-recognized article is a low-quality article in the prior art, not only substantially saving the time spent in recognizing whether the to-be-recognized article is the low-quality article, but also effectively saving manpower costs consumed in recognition, thereby greatly improving the recognition efficiency of the low-quality article.

Further optionally, on the basis of the technical solution of the embodiment shown in FIG. 1, the method may further include: obtaining a feature of the to-be-recognized article in the news-recommending system.

At this time, correspondingly the step 101 "according to the user feedback behavior feature of the to-be-recognized article and a predetermined low-quality article recognition model, recognizing whether the to-be-recognized article is a low-quality article" may specifically include: according to the user feedback behavior feature of the to-be-recognized article and the predetermined low-quality article recognition model, and with reference to the feature of the to-be-recognized article, recognizing whether the to-be-recognized article is a low-quality article.

That is to say, it is feasible to, in some scenarios, recognize whether the to-be-recognized article is a low-quality article according to the user feedback behavior feature of the to-be-recognized article and the predetermined low-quality article recognition model, and in some other scenarios, recognize whether the to-be-recognized article is a low-quality article according to the user feedback behavior feature of the to-be-recognized article and the predetermined low-quality article recognition model, and with reference to the feature of the to-be-recognized article. For details, please refer to depictions of the following method embodiment.

Further optionally, on the basis of the technical solution of the above embodiment, the step 101 "according to the user feedback behavior feature of the to-be-recognized article and a predetermined low-quality article recognition model, recognizing whether the to-be-recognized article is a low-quality article" may further include the following steps:

(a1) collecting user feedback behavior features corresponding to respective training articles in several training articles whose known class is a low-quality article or non-low-quality article, as training data, to obtain several training data;

(a2) according to the several training data, training the low-quality article recognition model.

In the present embodiment, the collected several training data may include data of positive examples and negative examples, namely, low-quality articles and non-low-quality articles. When low-quality resources, namely, low-quality articles are collected, said portion of data mainly come from two aspects: on the one hand, data that do not pass manual check in the news-recommending system; on the other hand, collect and manually mark resources for which users click more dislike, as suspicious low-quality resources.

When non-low-quality resources, namely, non-low-quality articles are collected, said portion of data are connected from two aspects: in one aspect, mark author granularity, mark news author who wrote good-quality articles, and then consider articles of such authors as non-low-quality articles; in another aspect, collect and manually-mark articles which are clicked and opened by users more frequently, which have sharing and store-in-favorite behaviors. When the news-recommending system pushes an article to the user, if the user is interested in it, he executes an clicking and opening operation. Statistics of clicking and opening times is statistics of times of clicking and opening the article.

The collected several training data in the present embodiment mainly include user behavior feedback features of articles whose known class is low-quality article, and user behavior feedback features of articles whose known class is non-low-quality article. Each training data corresponds to data of one training article. Then, the low-quality article recognition model is trained according to the user behavior feedback features and known classes in the respective training data.

Further optionally, if reference needs to be made to the feature of the to-be-recognized article when whether the to-be-recognized article is a low-quality article is recognized according to the user feedback behavior feature of the to-be-recognized article and the predetermined low-quality article recognition model, correspondingly the collected several training data in step (a1) further need to include corresponding features of the training articles.

The low-quality article recognition model of the present embodiment may specifically be a neural network model. Reference may be made to depictions of the following method embodiment for details.

Figure 2:
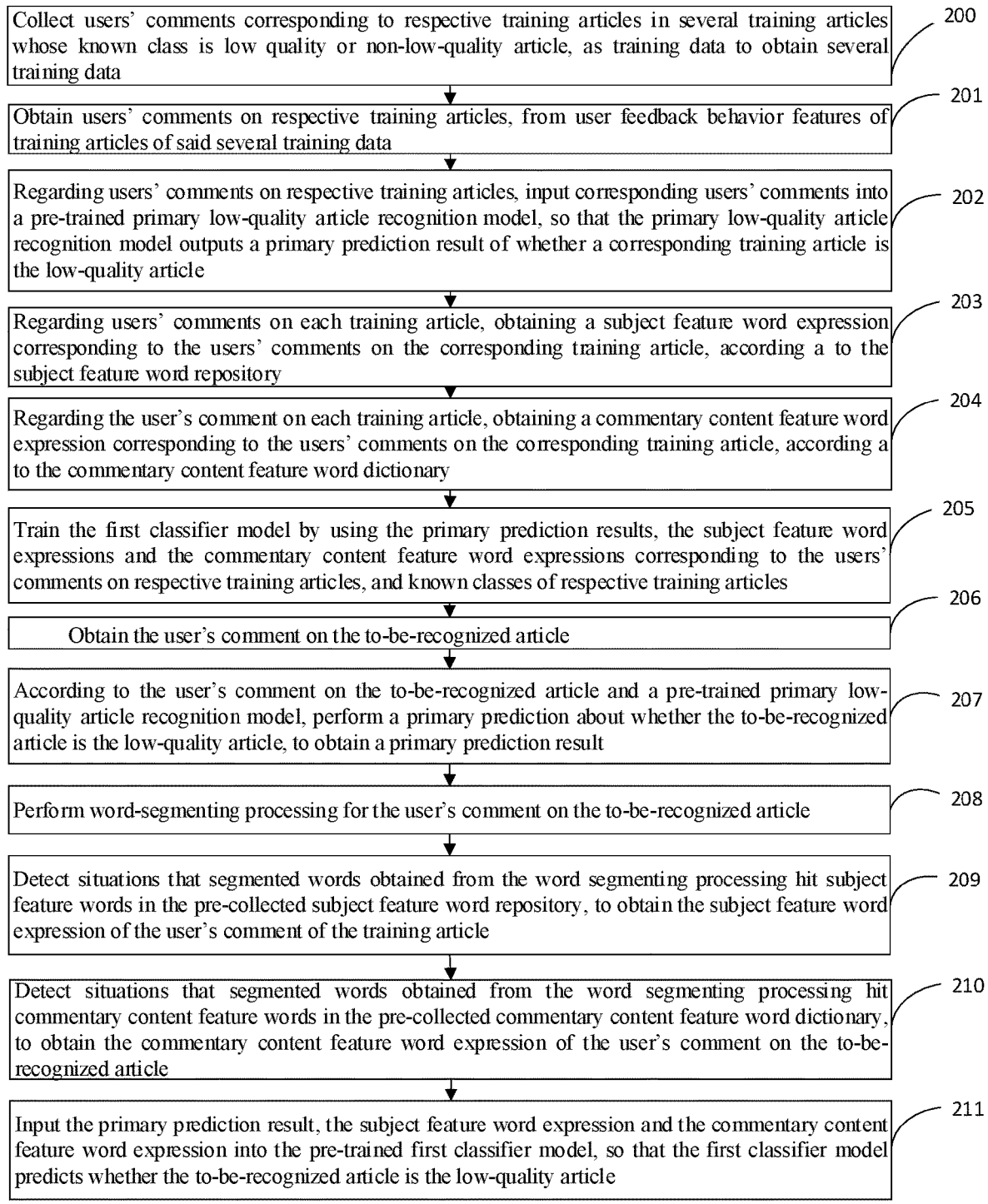
FIG. 2 is a flow chart of a second embodiment of a method for recognizing a low-quality article based on artificial intelligence according to the present disclosure.

FIG. 2 is a flow chart of a second embodiment of a method for recognizing a low-quality article based on artificial intelligence according to the present disclosure. In the method for recognizing a low-quality article based on artificial intelligence according to the present embodiment, the technical solution of the present disclosure is described by taking an example in which the user feedback behavior feature of the to-be-recognized article includes the user's comments and the low-quality article recognition model includes a first classifier model. As shown in FIG. 2, the method for recognizing a low-quality article based on artificial intelligence according to the present embodiment may specifically include the following steps:

200: collecting users' comments corresponding to respective training articles in several training articles whose known class is low quality or non-low-quality article, as training data, to obtain several training data;

The present embodiment takes an example in which the user feedback behavior feature only includes the user's comment, the low-quality article recognition model comprises a first classifier model, and whether the to-be-recognized article is the low-quality article is recognized according to user's comments. In practical application, different classifier models may share the same training data. At this time, the set of the collected several training data include, in addition to user's comments needed when the first classifier model recognizes the low-quality articles, other user feedback behavior features of the collected several training data, for example, clicking and opening times, times of clicking dislikes, reading progress, reading duration, times of storing in favorites, sharing times and so on.

In practical application, the number of the collected training data may be a number of a certain magnitude, for example, 200,000 to 300,000 or more. If a larger number of training data are collected, the first classifier model trained using the training data is more accurate, and subsequently the first classifier model recognizes whether the to-be-recognized article is the low-quality article more accurately.

201: obtaining users' comments on respective training articles, from user feedback behavior features of training articles of said several training data;

For example, the user feedback behavior features of training articles of said several training data, in addition to comments, clicking and opening times, times of clicking dislikes, reading progress, reading duration, times of storing in favorites, sharing times and so on. In the present embodiment, it is feasible to obtain users' comments therefrom.

202: regarding users' comments on respective training articles, inputting corresponding users' comments into a pre-trained primary low-quality article recognition model, so that the primary low-quality article recognition model outputs a primary prediction result of whether a corresponding training article is the low-quality article;

The primary low-quality article recognition model of the present embodiment may specifically employ a structure of a Convolutional Neural Network (CNN) model. The primary low-quality article recognition model is an end-to-end model for recognizing whether the to-be-recognized article is a low-quality article according to users' comments. Since the accuracy of the recognition result of the primary low-quality article recognition model is not very high, a primary prediction result output by it may be input of the first classifier model, so that the first classifier model may more accurately predict whether the to-be-recognized article is the low-quality article.

The primary low-quality article recognition model of the present embodiment also needs to be obtained by pre-training. For example, before step 202, the method may further include: using users' comments corresponding to respective training articles and known classes of respective training articles, to train the primary low-quality article recognition model; for example, a process of training the primary low-quality article recognition model may specifically include the following steps:

inputting users' comments corresponding to respective training articles in turn into the primary low-quality article recognition model, so that the primary low-quality article recognition model predicts a predicted class of a corresponding training articles; judging whether the predicted class of the training article is consistent with the known class; in case of inconsistency, adjusting parameters of the primary low-quality article recognition model so that the predicted class of the training article as predicted by the primary low-quality article recognition model tends to be consistent with the known class; according to the above steps, repeatedly using users' comments on respective training articles to train the primary low-quality article recognition model until the primary low-quality article recognition model converges; determining parameters of the primary low-quality article recognition model and thereby determining the primary low-quality article recognition model.

Specifically, before training, the parameters of the primary low-quality article recognition model are set as having initial values. When the users' comments on the first training data are input into the primary low-quality article recognition model, the primary low-quality article recognition model may predict whether the training article of the training data is a low-quality article according to the input users' comments and in conjunction with the initial values of parameters of the primary low-quality article recognition model, namely, predict a class of the training article. The class of the training article includes low-quality article or non-low-quality article. If the predicted class is consistent with the known class of the training article in the training data, the parameters of the primary low-quality article recognition model are not adjusted temporarily. Then next training data is input in the above manner into the primary low-quality article recognition model for training. Otherwise, if the predicted class is inconsistent with the known class of the training article in the training data, at this time it is possible to adjust the parameters of the primary low-quality article recognition model so that the primary low-quality article recognition model predicts that the predicted class of the training article tends to be consistent with the known class. Then, it is feasible to store the parameters of the primary low-quality article recognition model, continues to use and input next training data into the primary low-quality article recognition model for training in the above manner. In a similar manner, all training data are used to train the primary low-quality article recognition model until the primary low-quality article recognition model converges, namely, training data are input for multiple times, and the predicted class of the training article corresponding to the training data is consistent with the known class, whereupon the training of the primary low-class article recognition model is completed and whereupon the parameters of the primary low-quality article recognition model are determined and thereby the primary low-quality article recognition model is determined.

203: regarding users' comments on each training article, obtaining a subject feature word expression corresponding to the users' comments on the corresponding training article, according to the subject feature word repository;

For example, regarding the users' comments on each training article, it is feasible to first perform word segmentation for the users' comments, namely segment words, to obtain a plurality of segmented words of a minimum unit. This may be specifically implemented by referring to a relevant word segmenting technology, and will not be detailed any more here. Then, it is possible to detect situations that segmented words obtained from the word segmenting processing hit subject feature words in the pre-collected subject feature word repository, to obtain the subject feature word expression of the users' comments on the training article.

The subject feature word repository of the present embodiment comprises a plurality of subject feature words which each are a commenting subject which is pre-collected and used to comment on the low-quality article.

For example, if the user's comment is a negative comment, it is necessary to distinguish whether the user's comment is a comment on the article quality or article author, or on an event or entity in the article. For example, regarding a negative comment under star news, it is necessary to distinguish whether the negative comment is the user's negative comment on a star because he does not like the star, or a negative comment on quality of the content of the news. For example, in the present embodiment, it is feasible to pre-filter out some users' negative comments on the quality of the content of the news, namely, filter out users' comments on the low-quality article, in a manually-checking manner. Then, it is feasible to collect commenting subjects in these negative users' comments, as commenting subjects that comment on the low-quality article, namely, subject feature words. And these subject feature words are stored in a subject feature word repository.

Upon use, after word segmentation is performed for the user's comment on each training article, judgment is made for situations that segmented words obtained from the word segmentation hit subject feature words in the subject feature word repository. For example, in case of hit, the segmented word may be identified as 1; in case of miss, the segmented word may be identified as 0. As such, it is feasible to obtain the subject feature word expression corresponding to the user's comment on the training article; the subject feature word expression may specifically be in a form of a vector, which only includes two kinds of numbers: 0 and 1. The dimensions of the vector are equal to the number of the subject feature words included in the subject feature word repository.

204: regarding the user's comment on each training article, obtaining a commentary content feature word expression corresponding to the users' comments on the corresponding training article, according to the commentary content feature word dictionary;

Regarding the user's comment on each training article, likewise, it is feasible to first perform word segmentation for the user's comment, namely segment words, to obtain a plurality of segmented words of a minimum unit. Then, it is possible to detect situations that segmented words obtained from the word segmenting processing hit commentary content feature words in the pre-collected commentary content feature word dictionary, to obtain the commentary content feature word expression of the users' comments on the training article.

The commentary content feature word dictionary of the present embodiment comprises a plurality of commentary content feature words which each are a word which is pre-collected and used to comment on the low-quality article.

Likewise, in the present embodiment, it is feasible to pre-filter out some users' negative comments on the quality of the content of the news, namely, filter out users' comments on the low-quality article, in a manually-checking manner. Then, it is feasible to collect typical commentary content feature words in these negative user's comments, as commentary content feature words for commenting on the low-quality article. For example, it is feasible to perform word segmentation for the collected users' comments on all low-quality articles, then make statistics of frequency of appearance of words after the word segmentation in all low-quality articles, and obtain top N words with a higher appearance frequency as the commentary content feature words, and store these commentary content feature words in the commentary content feature word dictionary.

That is to say, the commentary content feature word dictionary of the present embodiment mines commentary content feature words under various low-quality classes. For example, comments such as "cheating traffic" and "incongruous" mostly appear under sensational headline writer's news, and may be regarded as the commentary content feature words.

Alternatively, the commentary content feature word dictionary of the present embodiment may also be generated in the following manner: the user may collect a plurality of users' comments on low-quality articles to generate a commentary corpus set. Then, it is feasible to perform word segmentation for users' comments in the commentary corpus set by using the current word-segmenting technology. Then, since the network develops swiftly, the users' comments often include some words newly appearing in the network, whereupon discovery of some new words needs to be performed. Upon discovery of new words, reference may be made to a coagulation degree and an information entropy between characters in the word, and a word frequency of the word appearing in the commentary corpus set. When the coagulation degree, information entropy and the word frequency of a certain word are all larger than their respective thresholds, the word may be regarded as a newly-discovered word. Then, it is feasible to put together words obtained from the word segmentation of users' comments in the commentary corpus set by using the current word-segmenting technology, to generate a word repository. Then, the user may set a plurality of seed words for evaluating low-quality articles. The user may further classify evaluations of low-quality articles into a plurality of classes, for example, cheating traffic, or distorting the truth, or other classes of low-quality articles. Then, it is feasible to respectively set classes of seed words according to the classes. Then, words co-occurring in the commentary corpus set and the classes of seed words may be screened out from a word repository comprised of the newly-discovered words and words obtained from the word segmentation. It is possible to top N words with a maximum co-occurrence frequency from the co-occurring words, and then consider the top N words with a maximum co-occurrence frequency and the classes of seed words respectively as the commentary content feature words, to constitute the commentary content feature word dictionary together.

Upon use, after word segmentation is performed for the user's comment on each training article, judgment is made for situations that segmented words obtained from the word segmentation hit the commentary content feature words in the commentary content feature word dictionary. For example, in case of hit, the segmented word may be identified as 1; in case of miss, the segmented word may be identified as 0. As such, it is feasible to obtain the commentary content feature word expression corresponding to the user's comment on the training article; the commentary content feature word expression may specifically be in a form of a vector, which only includes two kinds of numbers: 0 and 1. The dimensions of the vector are equal to the number of the commentary content feature words included in the commentary content feature word dictionary.

205: training the first classifier model by using the primary prediction results, the subject feature word expressions and the commentary content feature word expressions corresponding to the users' comments on respective training articles, and known classes of respective training articles;

Upon training, regarding each training data, it is feasible to, according to the above steps 202, 203 and 204, respectively obtain the primary prediction result, the subject feature word expression and the commentary content feature word expression of said training data, and then input the primary prediction result, the subject feature word expression and the commentary content feature word expression of said training data together into first classifier model.

Upon training for the first time, parameters of the first classifier model may be set having initial values. After the primary prediction result, the subject feature word expression and the commentary content feature word expression of the first training data are input into the first classifier model, the first classifier model may predict whether the training data is the low-quality article according to the initial values of the parameters and the input parameters. If the predicted class is consistent with the known class, next training data is further used for training; if the predicted class is inconsistent with the known class, it is feasible to adjust the parameters of the first classifier model so that the first classifier model predicts that the predicted class of the training article tends to be consistent with the known class. Then, it is feasible to store the parameters of the first classifier model, continues to use and input next training data into the first classifier model for training in the above manner. In a similar manner, all training data are used to train the first classifier model until the first classifier model converges, namely, training data are input for multiple times, and the predicted class of the training article corresponding to the training data is consistent with the known class, whereupon the training of the first classifier model is completed and whereupon the parameters of the first classifier model may be determined and thereby the first classifier model may be determined. The first classifier model of the present embodiment may employ a Gradient Boosting Decision Tree (GBDT).

The above-mentioned first classifier model of the present embodiment may be obtained by pre-training offline. In the following steps, the first classifier model is used to perform online detection of the to-be-recognized article.

206: obtaining the user's comment on the to-be-recognized article;

207: according to the user's comment on the to-be-recognized article and a pre-trained primary low-quality article recognition model, performing a primary prediction about whether the to-be-recognized article is the low-quality article, to obtain a primary prediction result;

That is, the comment on the to-be-recognized article is input into the primary low-quality article recognition model, and the primary low-quality article recognition model outputs the primary prediction result.

208: performing word-segmenting processing for the user's comment on the to-be-recognized article;

209: detecting situations that segmented words obtained from the word segmenting processing hit subject feature words in the pre-collected subject feature word repository, to obtain the subject feature word expression of the user's comment of the training article;

Details will not be detailed any more here, and reference may be made to the implementation of step 203.

210: detecting situations that segmented words obtained from the word segmenting processing hit commentary content feature words in the pre-collected commentary content feature word dictionary, to obtain the commentary content feature word expression of the user's comment on the to-be-recognized article;

Details will not be detailed any more here, and reference may be made to the implementation of step 204.

211: inputting the primary prediction result, the subject feature word expression and the commentary content feature word expression into the pre-trained first classifier model, so that the first classifier model predicts whether the to-be-recognized article is the low-quality article.

Finally, the primary prediction result, the subject feature word expression and the commentary content feature word expression are input into the pre-trained first classifier model such as a GBDT model, so that the first classifier model predicts whether the to-be-recognized article is the low-quality article. For example, the first classifier model may be input as a confidence value. If the confidence value is larger than or equal to a certain confidence threshold, it may be believed that the training data is a low-quality article, and −1 may be output, which indicates that the to-be-recognized article is a low-quality article. If the confidence value is smaller than the confidence threshold, it may be believed that the training data is a non-low-quality article, and 1 may be output, which indicates that the to-be-recognized article is a non-low-quality article. The implementation mode upon training is similar to the above and will not be detailed any more here.

In addition, optionally, if the user feedback behavior feature of a certain to-be-recognized article does not include the user's comment, the user's comment obtained in step 206 is empty, the GBDT model may directly output 0, which indicates giving up voting.

Figure 3:
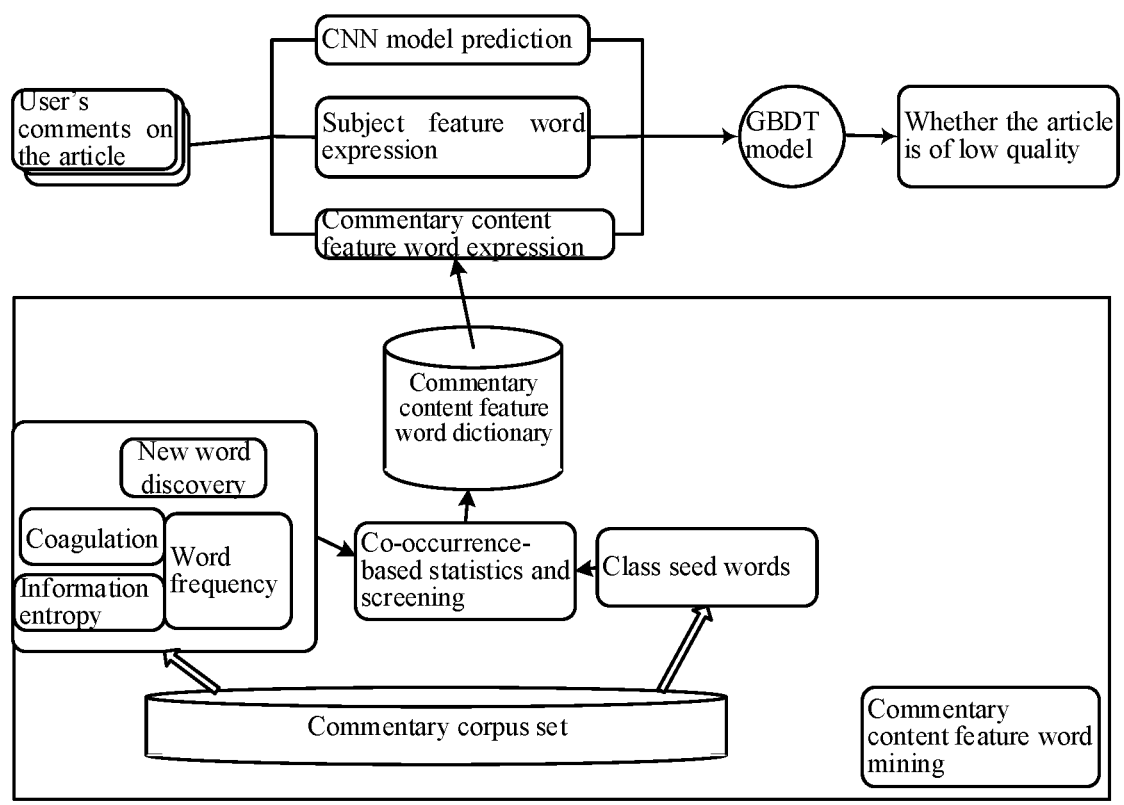
FIG. 3 is a schematic diagram of an application architecture of a method for recognizing a low-quality article based on artificial intelligence according to the present disclosure.

FIG. 3 is a schematic diagram of an example of an application architecture of a method for recognizing a low-quality article based on artificial intelligence according to the present disclosure. According to the architecture as shown in FIG. 3, the process of the embodiment shown in FIG. 2 may be specifically used to implement the method for recognizing a low-quality article based on artificial intelligence. Details will not be detailed any more here, and reference may be made to depictions in the above embodiments.

According to the method for recognizing a low-quality article based on artificial intelligence according to the present embodiment, the above technical solution can be employed to automatically recognize whether the to-be-recognized article is a low-quality article according to the user's comment of the to-be-recognized article and the predetermined low-quality article recognition model, thereby overcoming the technical problem about consumption of time and effects and low recognition efficiency in manually checking whether the to-be-recognized article is a low-quality article in the prior art, not only substantially saving the time spent in recognizing whether the to-be-recognized article is the low-quality article, but also effectively saving manpower costs consumed in recognition, thereby greatly improving the recognition efficiency of the low-quality article.

Figure 4:
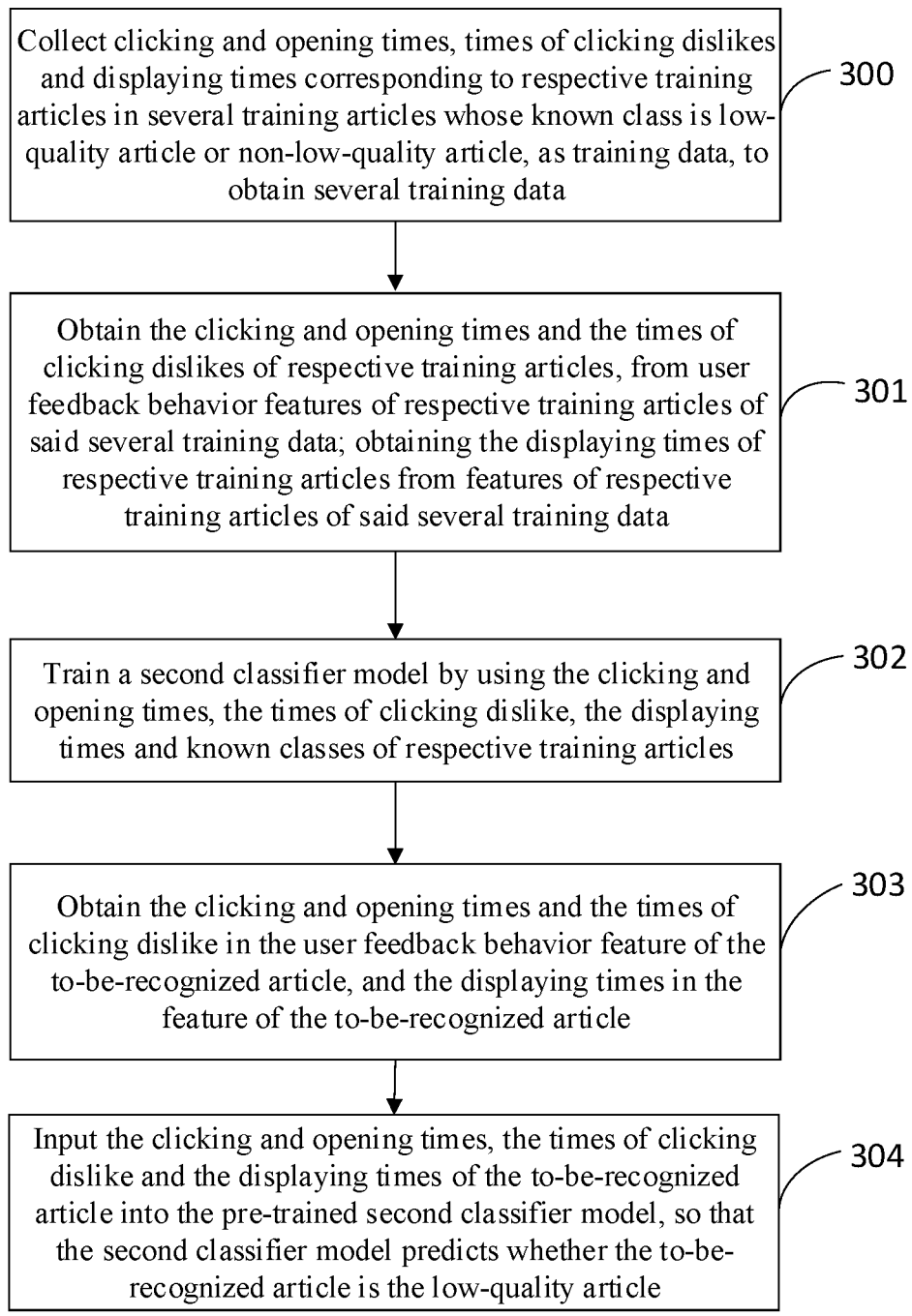
FIG. 4 is a flow chart of a third embodiment of a method for recognizing a low-quality article based on artificial intelligence according to the present disclosure.

FIG. 4 is a flow chart of a third embodiment of a method for recognizing a low-quality article based on artificial intelligence according to the present disclosure. As shown in FIG. 4, the method for recognizing a low-quality article based on artificial intelligence according to the present embodiment, the technical solution of the present disclosure is described by taking an example in which the user feedback behavior feature of the to-be-recognized article includes the clicking and opening times and the times of clicking dislikes, and the feature of the to-be-recognized article includes displaying times, and the low-quality article recognition model includes a second classifier model. As shown in FIG. 4, the method for recognizing a low-quality article based on artificial intelligence according to the present embodiment may specifically include the following steps:

300: collecting clicking and opening times, times of clicking dislikes and displaying times corresponding to respective training articles in several training articles whose known class is low-quality article or non-low-quality article, as training data, to obtain several training data;

The present embodiment takes an example in which the user feedback behavior feature includes the clicking and opening times and the times of clicking dislikes, the feature of the article includes displaying times, and the low-quality article recognition model includes a second classifier model, to recognize whether the to-be-recognized article is the low-quality article according to the user's comments. In practical application, different classifier models may share the same training data. At this time, the set of the collected several training data may include all information characterizing the user feedback behavior feature. Details will not be detailed any more here, and reference may be made to the explanation of step 200 in the embodiment shown in FIG. 2.

301: obtaining the clicking and opening times and the times of clicking dislikes of respective training articles, from user feedback behavior features of respective training articles of said several training data; obtaining the displaying times of respective training articles from features of respective training articles of said several training data;

The displaying times of the present embodiment is times of displaying articles in a network recommendation system to the users. For example, a certain article is displayed for a total of 200 times. Among the 200 times, it is possible that the article is displayed to the same user for part of the 200 times, or that the article is displayed to different users for 200 times, namely, displayed to each of 200 users once. In the present embodiment, users are not taken into consideration, and it is only stated that the article is displayed 200 times. If the article is clicked and opened 100 times, 100 indicates the clicking and opening times. If dislike is clicked 50 times for this article, 50 indicates the times of clicking dislike. If the article is stored in favorites 120 times, 102 indicates the time of storing in favorites. If the article is shared 30 times, 30 indicates the sharing times.

302: training a second classifier model by using the clicking and opening times, the times of clicking dislike, the displaying times and known classes of respective training articles;

The training the second classifier model by using the clicking and opening times, the times of clicking dislike, the displaying times and known classes of respective training articles in the present embodiment differs from the step 205 of training the first classifier model by using the primary prediction results, the subject feature word expressions and the commentary content feature word expressions corresponding to the users' comments on respective training articles, and known classes of respective training articles in the embodiment shown in FIG. 2 only in that: replacing the primary prediction results, the subject feature word expressions and the commentary content feature word expressions corresponding to the users' comments on respective training articles in above step 205 with the clicking and opening times, the times of clicking dislike and the displaying times of respective training articles in this step. The principles for implementing the training process are the same. Details will not be detailed any more here, and reference may be made to the explanation of step 205 in the embodiment shown in FIG. 2.

The second classifier model of the present embodiment may specifically employ a logistic recurrent classification model.

Likewise, the above-mentioned second classifier model of the present embodiment may be obtained by pre-training offline. In the following steps, the second classifier model is used to perform online detection of the to-be-recognized article.

303: obtaining the clicking and opening times and the times of clicking dislike in the user feedback behavior feature of the to-be-recognized article, and the displaying times in the feature of the to-be-recognized article;

304: inputting the clicking and opening times, the times of clicking dislike and the displaying times of the to-be-recognized article into the pre-trained second classifier model, so that the second classifier model predicts whether the to-be-recognized article is the low-quality article.

Finally, it is feasible to input the clicking and opening times, the times of clicking dislike and the displaying times of the to-be-recognized article into the second classifier model for example a logistic recurrent classification model, so that the second classifier model predicts whether the to-be-recognized article is the low-quality article. For example, if the to-be-recognized article is recognized as the low-quality article, the output is −1, otherwise it is impossible to determine whether the article is the non-low-quality article according to these parameters, the voting may be abandoned and the output is 0.

According to the method for recognizing a low-quality article based on artificial intelligence according to the present embodiment, the above technical solution can be employed to automatically recognize whether the to-be-recognized article is a low-quality article according to the clicking and opening times, the times of clicking dislike and the displaying times of the to-be-recognized article, in combination with the pre-determined low-quality article recognition model, thereby overcoming the technical problem about consumption of time and effects and low recognition efficiency in manually checking whether the to-be-recognized article is a low-quality article in the prior art, not only substantially saving the time spent in recognizing whether the to-be-recognized article is the low-quality article, but also effectively saving manpower costs consumed in recognition, thereby greatly improving the recognition efficiency of the low-quality article.

Figure 5:
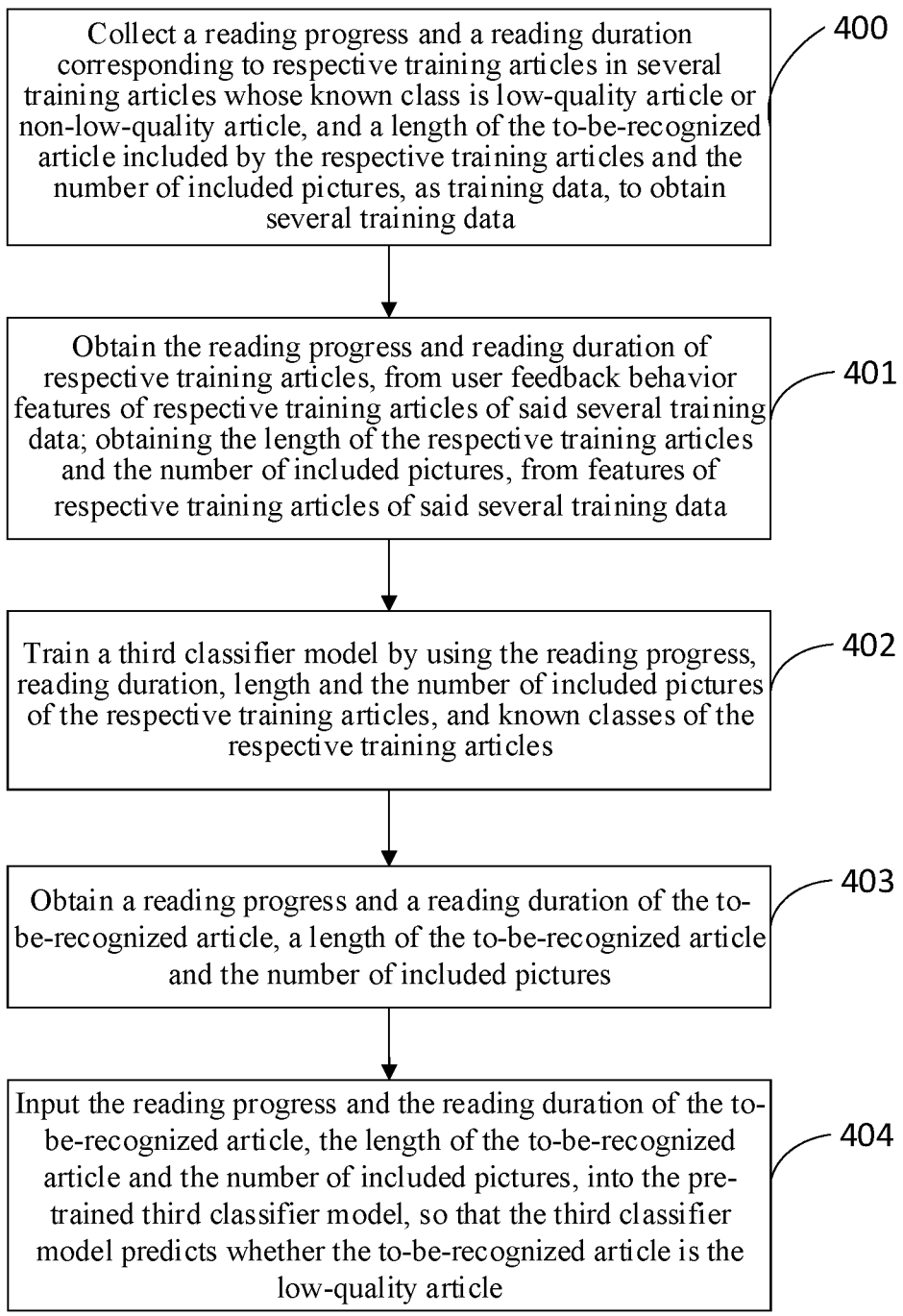
FIG. 5 is a flow chart of a fourth embodiment of a method for recognizing a low-quality article based on artificial intelligence according to the present disclosure.

FIG. 5 is a flow chart of a fourth embodiment of a method for recognizing a low-quality article based on artificial intelligence according to the present disclosure. As shown in FIG. 5, the method for recognizing a low-quality article based on artificial intelligence according to the present embodiment, the technical solution of the present disclosure is described by taking an example in which the user feedback behavior feature of the to-be-recognized article includes a reading progress and a reading duration, the feature of the to-be-recognized article includes a length of the to-be-recognized article and the number of included pictures, and the low-quality article recognition model includes a third classifier model. As shown in FIG. 5, the method for recognizing a low-quality article based on artificial intelligence according to the present embodiment may specifically include the following steps:

400: collecting a reading progress and a reading duration corresponding to respective training articles in several training articles whose known class is low-quality article or non-low-quality article, and a length of the to-be-recognized article included by the respective training articles and the number of included pictures, as training data, to obtain several training data;

401: obtaining the reading progress and reading duration of respective training articles, from user feedback behavior features of respective training articles of said several training data; obtaining the length of the respective training articles and the number of included pictures, from features of respective training articles of said several training data;

402: training a third classifier model by using the reading progress, reading duration, length and the number of included pictures of the respective training articles, and known classes of the respective training articles;

403: obtaining a reading progress and a reading duration of the to-be-recognized article, a length of the to-be-recognized article and the number of included pictures;

404: inputting the reading progress and the reading duration of the to-be-recognized article, the length of the to-be-recognized article and the number of included pictures, into the pre-trained third classifier model, so that the third classifier model predicts whether the to-be-recognized article is the low-quality article.

The present embodiment differs from the embodiment shown in FIG. 4 in that the user feedback behavior feature of the present embodiment includes the reading progress and the reading duration, and the feature of the article includes the length of the article and the number of included pictures, wherein the reading progress may be identified with a reading percentage, the reading duration may be identified with minute, and the length of the article may be identified with the number of characters. The user feedback behavior feature of the embodiment shown in FIG. 4 includes the clicking and opening times and the times of clicking dislike; and the feature of the article includes the times of displaying the article. The remaining implementation principles are the same. Details will not be detailed any more here, and reference may be made to depictions of the embodiment shown in FIG. 4.

Likewise, the third classifier model of the present embodiment may also specifically employ a logistic recurrent classification model. In the present embodiment, the third classifier model predicts whether the article is of low quality according to the reading progress, the reading duration, the length of the article and the number of included pictures. For example, if the reading progress is longer and the reading duration is longer, the article is more probably not low quality; if the reading progress is shorter and the reading duration is shorter, the article is more probably low quality. If the third classifier model recognizes that the to-be-recognized article is a low-quality article, the output is −1. Otherwise, if it is not recognized that the to-be-recognized article is a low-quality article, it may be believed that the to-be-recognized article is a non-low-quality article, whereupon the output may be 1.

According to the method for recognizing a low-quality article based on artificial intelligence according to the present embodiment, the above technical solution can be employed to automatically recognize whether the to-be-recognized article is a low-quality article according to the reading progress and reading duration of the to-be-recognized article, the length of the to-be-recognized article and the number of included pictures, in combination with the pre-determined low-quality article recognition model, thereby overcoming the technical problem about consumption of time and effects and low recognition efficiency in manually checking whether the to-be-recognized article is a low-quality article in the prior art, not only substantially saving the time spent in recognizing whether the to-be-recognized article is the low-quality article, but also effectively saving manpower costs consumed in recognition, thereby greatly improving the recognition efficiency of the low-quality article.

Figure 6:
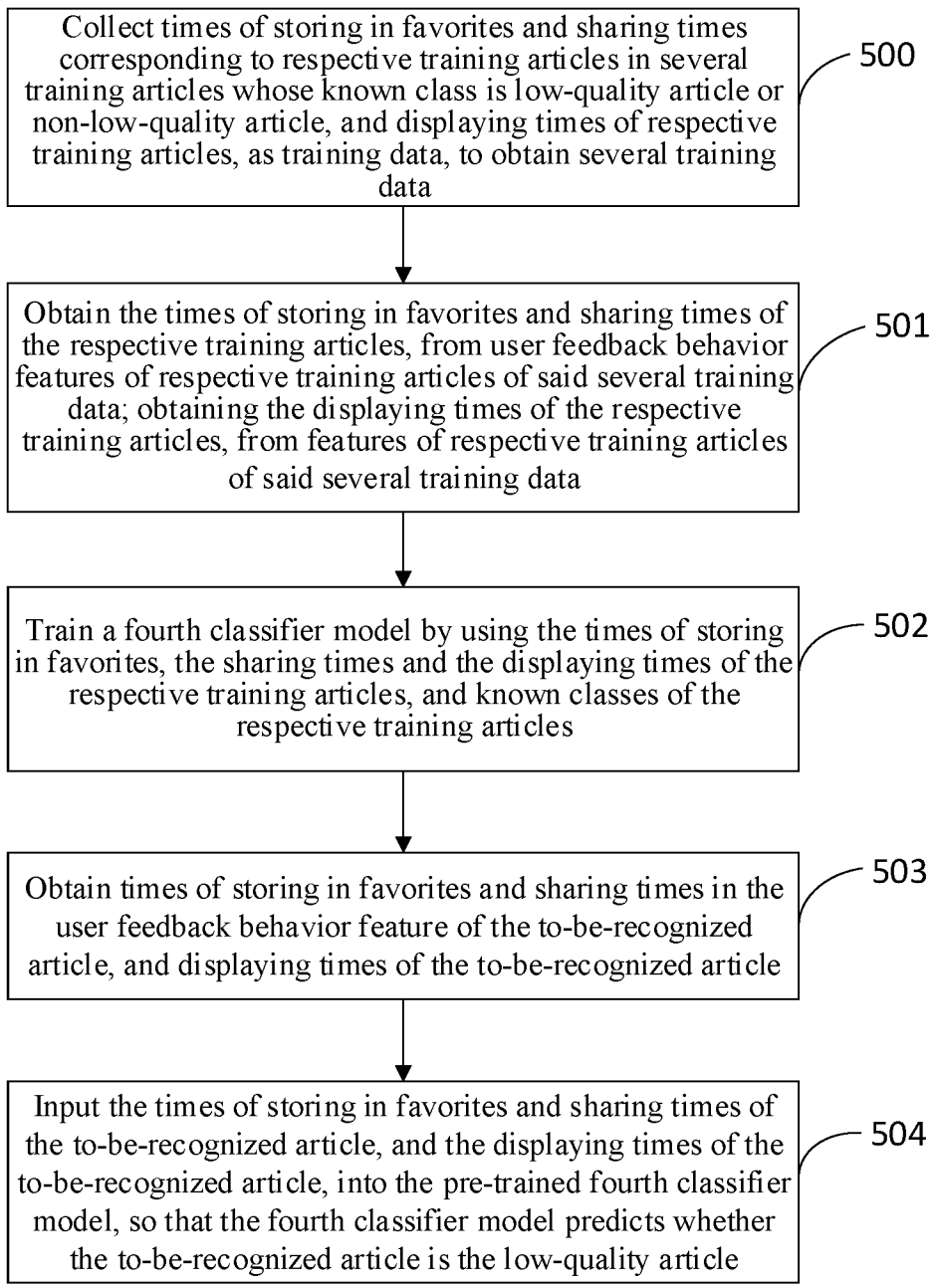
FIG. 6 is a flow chart of a fifth embodiment of a method for recognizing a low-quality article based on artificial intelligence according to the present disclosure.

FIG. 6 is a flow chart of a fifth embodiment of a method for recognizing a low-quality article based on artificial intelligence according to the present disclosure. As shown in FIG. 6, the method for recognizing a low-quality article based on artificial intelligence according to the present embodiment, the technical solution of the present disclosure is described by taking an example in which the user feedback behavior feature of the to-be-recognized article includes times of storing in favorites and sharing times, the feature of the to-be-recognized article includes times of displaying the to-be-recognized article, and the low-quality article recognition model includes a fourth classifier model. As shown in FIG. 6, the method for recognizing a low-quality article based on artificial intelligence according to the present embodiment may specifically include the following steps:

500: collecting times of storing in favorites and sharing times corresponding to respective training articles in several training articles whose known class is low-quality article or non-low-quality article, and displaying times of respective training articles, as training data, to obtain several training data;

501: obtaining the times of storing in favorites and sharing times of the respective training articles, from user feedback behavior features of respective training articles of said several training data; obtaining the displaying times of the respective training articles, from features of respective training articles of said several training data;

502: training a fourth classifier model by using the times of storing in favorites, the sharing times and the displaying times of the respective training articles, and known classes of the respective training articles;

503: obtaining times of storing in favorites and sharing times in the user feedback behavior feature of the to-be-recognized article, and displaying times of the to-be-recognized article;

504: inputting the times of storing in favorites and sharing times of the to-be-recognized article, and the displaying times of the to-be-recognized article, into the pre-trained fourth classifier model, so that the fourth classifier model predicts whether the to-be-recognized article is the low-quality article.

The present embodiment differs from the embodiment shown in FIG. 4 in that the user feedback behavior feature of the present embodiment includes the times of storing in favorites and sharing times, and the feature of the article includes the displaying times of the article. However, the user feedback behavior feature of the embodiment shown in FIG. 4 includes the clicking and opening times and the times of clicking dislike; and the feature of the article includes the times of displaying the article. The remaining implementation principles are the same. Details will not be detailed any more here, and reference may be made to depictions of the embodiment shown in FIG. 4.

Likewise, the fourth classifier model of the present embodiment may also specifically employ a logistic recurrent classification model. In the present embodiment, the fourth classifier model predicts whether the article is of low quality according to the times of storing in favorites and sharing times and the displaying times of the article. If the times of storing in favorites and the sharing times are larger, this indicates that the user likes the article more and the article is more probably not low quality; if the fourth classifier model recognizes that the to-be-recognized article is a low-quality article, the output is 1. Otherwise, if it is impossible to determine whether the to-be-recognized article is non-low-quality, whereupon the output may be 0, and voting is abandoned.

According to the method for recognizing a low-quality article based on artificial intelligence according to the present embodiment, the above technical solution can be employed to automatically recognize whether the to-be-recognized article is a low-quality article according to the times of storing in favorites, sharing times and displaying times of the to-be-recognized article, in combination with the pre-determined low-quality article recognition model, thereby overcoming the technical problem about consumption of time and effects and low recognition efficiency in manually checking whether the to-be-recognized article is a low-quality article in the prior art, not only substantially saving the time spent in recognizing whether the to-be-recognized article is the low-quality article, but also effectively saving manpower costs consumed in recognition, thereby greatly improving the recognition efficiency of the low-quality article.

It needs to be appreciated that the embodiments shown in FIG. 2, FIG. 4, FIG. 5 and FIG. 6 take an example in which the low-quality article recognition model respectively includes a classifier model. In practical application, the low-quality article recognition model may also include at least two pre-trained classifier models, for example, may include at least two of the first classifier model, the second classifier model, the third classifier model and the fourth classifier model in FIG. 2, and FIG. 4-FIG. 6. For example, if the low-quality article recognition model comprises at least pre-trained classifier models, the step "recognizing whether the to-be-recognized article is a low-quality article, according to the user feedback behavior feature of the to-be-recognized article and a predetermined low-quality article recognition model, and in combination with the feature of the to-be-recognized article" may specifically include the follow steps:

(b1) obtaining the classifier models' prediction results about whether the to-be-recognized article is the low-quality article, according to the user feedback behavior feature of the to-be-recognized article, or the user feedback behavior feature of the to-be-recognized article and the feature of the to-be-recognized article, and in combination with the pre-trained classifier models;

That is to say, the present embodiment includes two types of solutions. The first type may be obtaining the classifier models' prediction results about whether the to-be-recognized article is the low-quality article, according to the user feedback behavior feature of the to-be-recognized article and in combination with the pre-trained classifier models; the second type may be obtaining the classifier models' prediction results about whether the to-be-recognized article is the low-quality article, according to the user feedback behavior feature of the to-be-recognized article and the feature of the to-be-recognized article and in combination with the pre-trained classifier models. The first type corresponds to the technical solution of the embodiment shown in FIG. 2. The second type corresponds to the technical solution of any of FIG. 4-FIG. 6. Regarding details of the implementation of the step, reference may be made to the depictions of the above embodiment: obtaining the classifier models' prediction results about whether the to-be-recognized article is the low-quality article by obtaining the corresponding user feedback behavior feature of, or the user feedback behavior feature and the feature of the to-be-recognized article, and in combination with the pre-trained classifier models.

(b2) predicting whether the to-be-recognized article is the low-quality article, according to the classifier models' prediction results about whether the to-be-recognized article is the low-quality article, and the predetermined weights of respective classifier models.

That is to say, in the present embodiment, it is feasible to, according to weights of the respective classifier models, multiply the classifier models' prediction results by weights, and then summate together, and predict whether the to-be-recognized article is the low-quality article according to a result of summation. In the present embodiment, it is feasible to set a larger weight for the classifier model which predicts accurately, and a smaller weight for a classifier model with a lower accuracy, for example, each classifier's weight may be set by the user. Optionally, before step (b2), the method further comprises: receiving weights of respective classifier models set by the user. Reference may be made to depictions of relevant embodiments for training of the classifiers in the present embodiment. Details are not presented any more here.

Figure 7:
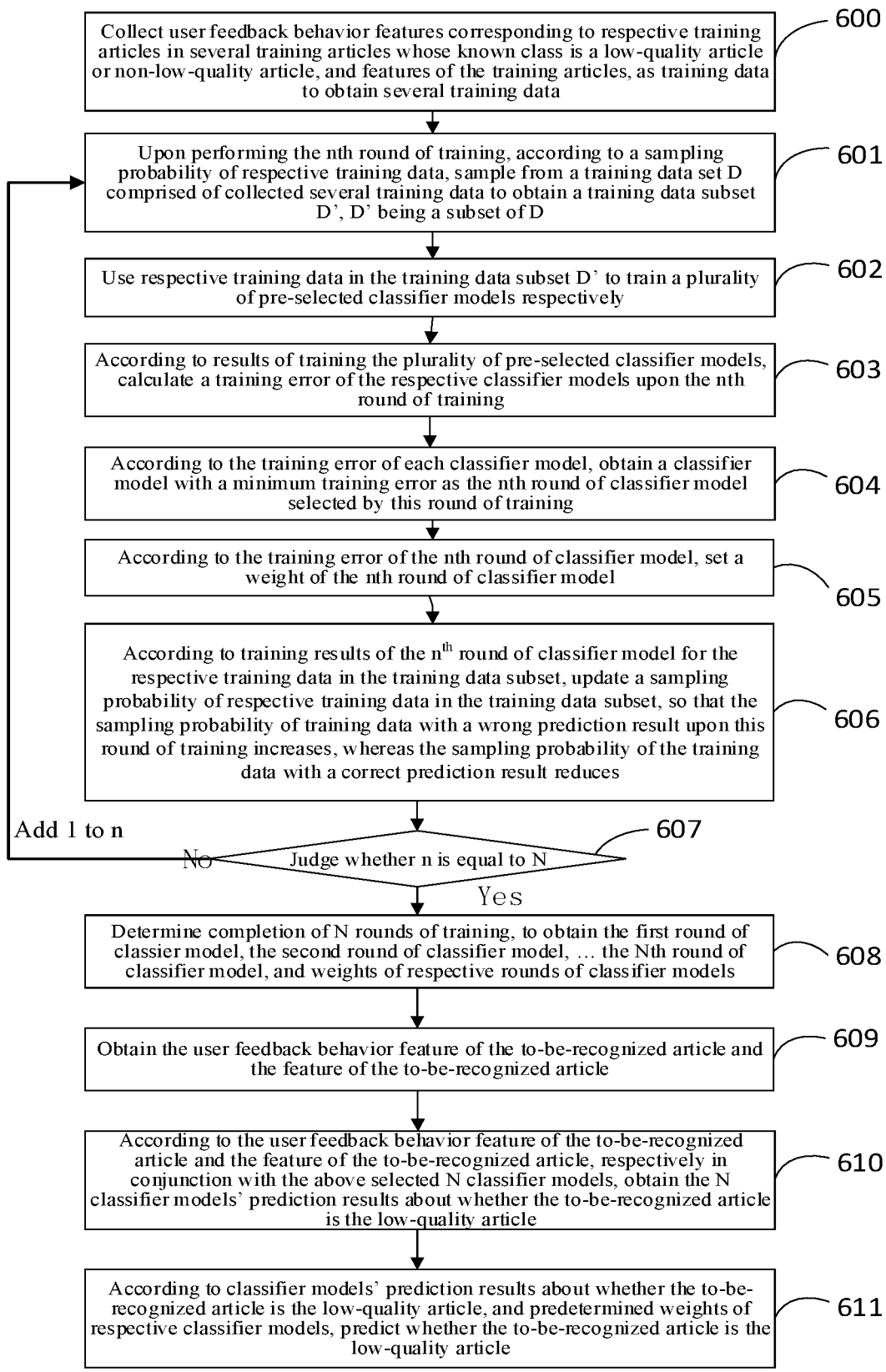
FIG. 7 is a flow chart of a sixth embodiment of a method for recognizing a low-quality article based on artificial intelligence according to the present disclosure.

FIG. 7 is a flow chart of a sixth embodiment of a method for recognizing a low-quality article based on artificial intelligence according to the present disclosure. As shown in FIG. 7, the technical solution of the present disclosure about the method for recognizing a low-quality article based on artificial intelligence according to the present embodiment is described by merging the plurality of classifier models by a Boosting method. As shown in FIG. 7, the method for recognizing a low-quality article based on artificial intelligence according to the present embodiment may specifically include the following steps:

600: collecting user feedback behavior features corresponding to respective training articles in several training articles whose known class is a low-quality article or non-low-quality article, and features of the training articles, as training data to obtain several training data;

In the present embodiment, the collected user feedback behavior features corresponding to respective training articles in the training data and features of the training articles take all user feedback behavior features and features of the training articles of the embodiments shown in FIG. 2 and FIG. 4-FIG. 6 as an example. Details are not detailed any more here, and reference may be made to depictions of relevant embodiments.

601: upon performing the $n^{th}$ round of training, according to a sampling probability of respective training data, sampling from a training data set D comprised of collected several training data to obtain a training data subset D', D' being a subset of D;

Upon training for the first time, a value of n is set as 1, i.e., training is started from n=1. An initial sampling probability of the respective training data upon the first round of training is the same; in each subsequent round of training, the sampling probability of the training data adjusted by the preceding round of training is employed to select the training data subset. In the present embodiment, a maximum number of rounds of training of n is N, N being a positive integer larger than 1. Assuming that the training data subset of the present embodiment may be represented as D={x1, y1; ... xi, yi; ...; xm, ym}, where xi represents input data upon training, yi represents data that should be output upon training, and m represents the number of training data. Therefore when n=1, namely, when the first round of training is performed, the sampling probability of the $i^{th}$ training data may be represented as $W_{n=0}^i = 1/m$. In fact, upon the first round of training, the sampling probability of each training data is equal. When each round of training is performed, the sampling probability $W_n^i$ of each training data is used to select the training data subset D'.

602: using respective training data in the training data subset D' to train a plurality of pre-selected classifier models respectively;

The plurality of pre-selected classifier models in the present embodiment may include the first classifier model that is represented as $C_n^1$ of the embodiment shown in the above FIG. 2, the second classifier model that is represented as $C_n^2$ of the embodiment shown in the above FIG. 4, the third classifier model that is represented as $C_n^3$ of the embodiment shown in the above FIG. 5, and the fourth classifier model that is represented as $C_n^4$ of the embodiment shown in the above FIG. 6. The training of the present embodiment has the same principle as the training of the above FIG. 2, and FIG. 4-FIG. 6.

603: according to results of training the plurality of pre-selected classifier models, calculating a training error of the respective classifier models upon the $n^{th}$ round of training;

During training, each classifier model sometimes predicts correctly, and sometimes predict wrongly; the result of each round of training may be used to calculate the training error of each classifier model upon the $n^{th}$ round of training.

604: according to the training error of each classifier model, obtaining a classifier model with a minimum training error as the $n^{th}$ round of classifier model selected by this round of training;

For example, upon the $n^{th}$ round of training, it is feasible to select a classifier model with a minimum error from $C_n^1$, $C_n^2$, $C_n^3$ and $C_n^4$ as the classifier model that performs the best in this round of training, and may be represented as $C_n^{best}$, and then regard it as the $n^{th}$ round of classifier model selected by this round. Furthermore, the training error of the $n^{th}$ round of classifier model $C_n^{best}$ may be represented as $E_n$.

605: according to the training error of the $n^{th}$ round of classifier model, setting a weight of the $n^{th}$ round of classifier model;

For example, in the present embodiment, the weight $\alpha_n$ of the $n^{th}$ round of classifier model $E_n$ may be set and represented as $\alpha_n = \frac{1}{2} * \ln(1-E_n)/E_n$.

606: according to training results of the $n^{th}$ round of classifier model for the respective training data in the training data subset, updating a sampling probability of respective training data in the training data subset, so that the sampling probability of training data with a wrong prediction result upon this round of training increases, whereas the sampling probability of the training data with a correct prediction result reduces;

For example, the updated sampling probability of respective training data in the training data subset may be represented as $$W_{n+1}^i = W_n/Z_n * \begin{cases} e^{-\alpha_n}, \text{if } h_n(xi) = yi \\ e^{\alpha_n}, \text{if } h_n(xi) \neq yi \end{cases},$$

where $h_n(xi)$ is a prediction result of the $n^{th}$ round of classifier model $C_n^{best}$ for xi.

After the sampling probability is updated, the sampling probability of training data with a wrong prediction result upon this round of training may increase. As such, the probability that the training data is selected upon next training may be improved to improve the training efficiency. And the sampling probability of the training data with a correct prediction result reduces. In this way, since this training data is already predicted correctly, the probability that it is selected upon next training may be reduced to improve the training efficiency.

607: judging whether n is equal to N, and if yes, performing step 608; if no, adding 1 to n, and returning to step 601;

608: determining completion of N rounds of training, to obtain the first round of classier model, the second round of classifier model, . . . the $N^{th}$ round of classifier model, and weights of respective rounds of classifier models; performing step 609;

wherein N is a positive integer larger than 1, and it is feasible to, in the above manner, repeatedly perform the above steps 601-605 totally N times, perform N rounds of training, to respectively obtain the first round of classier model, the second round of classifier model, . . . the $N^{th}$ round of classifier model, and weights of respective rounds of classifier models.

It needs to be appreciated that the N classifier models selected by the N rounds of training may include the same classifier model structure, for example, may include two first classifier models, but the two first classifier models are selected in different rounds of training, so their parameters are different.

609: obtaining the user feedback behavior feature of the to-be-recognized article and the feature of the to-be-recognized article;

610: according to the user feedback behavior feature of the to-be-recognized article and the feature of the to-be-recognized article, respectively in conjunction with the above selected N classifier models, obtaining the N classifier models' prediction results about whether the to-be-recognized article is the low-quality article;

Regarding the implementation of this step, it is specifically feasible to predict whether the to-be-recognized article is the low-quality article, according to the user feedback behavior feature needed by the classifier models upon prediction, or the user feedback behavior feature and the feature of the to-be-recognized article. Reference may be made to relevant depictions of FIG. 2 and FIG. 4-FIG. 6 for details of specific parameters employed by the user feedback behavior feature and specific parameters employed by the feature of the article. No detailed comments are presented any more.

611: according to classifier models' prediction results about whether the to-be-recognized article is the low-quality article, and predetermined weights of respective classifier models, predicting whether the to-be-recognized article is the low-quality article.

For example, it is feasible to finally multiply the prediction results of the respective classifier models by their corresponding weights, then summate the products, as a final prediction result. For example, it may be $H(x)=\text{sign}(\Sigma_{n=1}^{N}\alpha_n h_n(x))$.

In the present embodiment, it is feasible to more accurately recognize whether the to-be-recognized article is the low-quality article, by merging a plurality of classifier models with different weights by a Boosting method.

Figure 8:
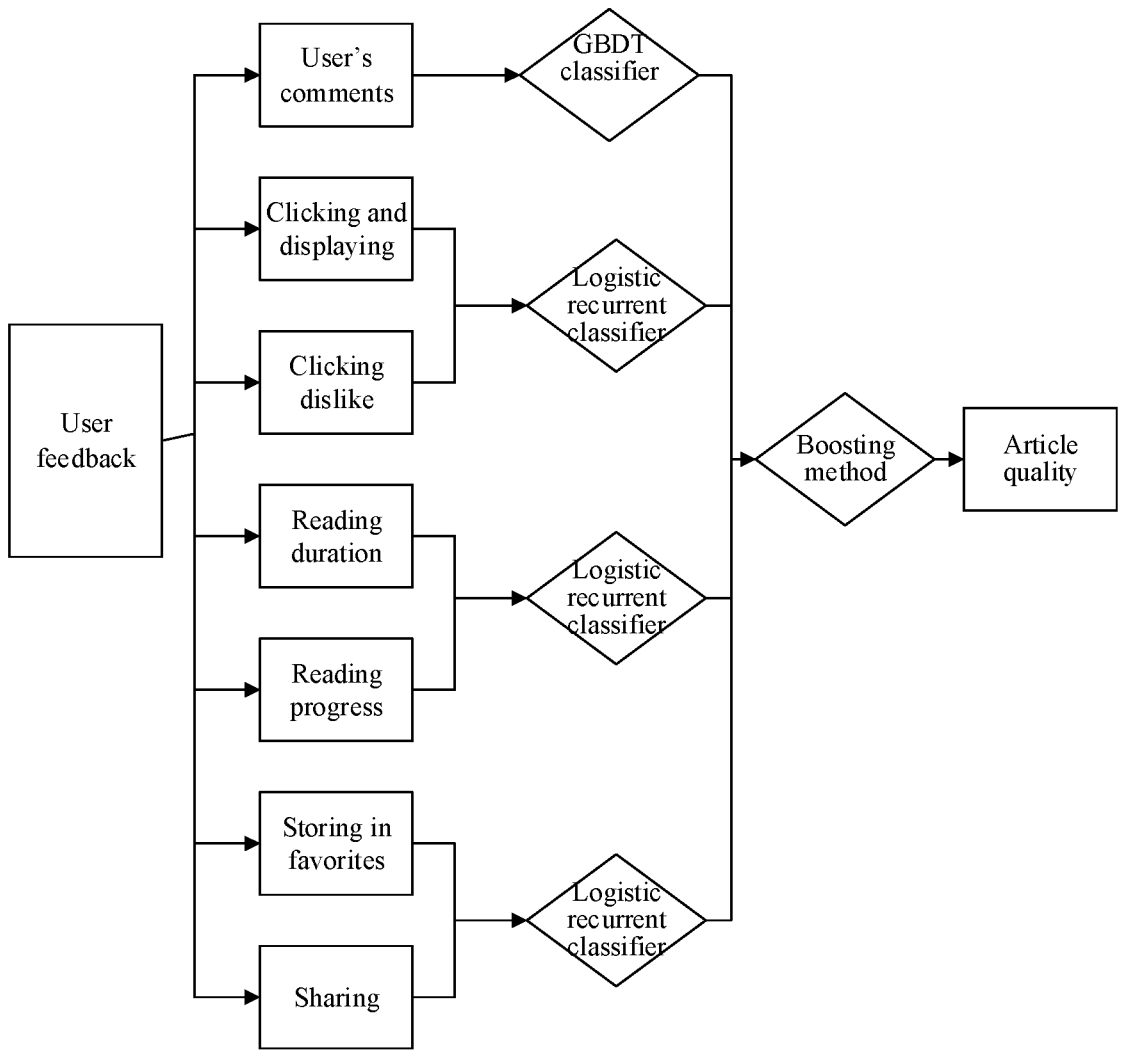
FIG. 8 is a schematic diagram of another application architecture of a method for recognizing a low-quality article based on artificial intelligence according to the present disclosure.

FIG. 8 is a schematic diagram of an example of another application architecture of a method for recognizing a low-quality article based on artificial intelligence according to the present disclosure. According to the architecture as shown in FIG. 8, the process of the embodiment shown in FIG. 7 may be specifically used to implement the method for recognizing a low-quality article based on artificial intelligence. Details will not be detailed any more here, and reference may be made to depictions in the above embodiments.

According to the method for recognizing a low-quality article based on artificial intelligence according to the present embodiment, the above technical solution can be employed to automatically recognize whether the to-be-recognized article is a low-quality article according to the user feedback behavior feature of the to-be-recognized article and the predetermined low-quality article recognition model, thereby overcoming the technical problem about consumption of time and effects and low recognition efficiency in manually checking whether the to-be-recognized article is a low-quality article in the prior art, not only substantially saving the time spent in recognizing whether the to-be-recognized article is the low-quality article, but also effectively saving manpower costs consumed in recognition, thereby greatly improving the recognition efficiency of the low-quality article.

Figure 9:
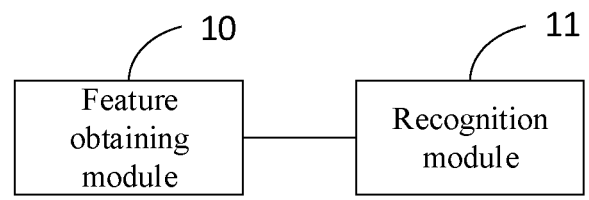
FIG. 9 is a structural schematic diagram of a first embodiment of an apparatus for recognizing a low-quality article based on artificial intelligence according to the present disclosure.

FIG. 9 is a structural schematic diagram of a first embodiment of an apparatus for recognizing a low-quality article based on artificial intelligence according to the present disclosure. As shown in FIG. 9, the apparatus for recognizing a low-quality article based on artificial intelligence according to the present embodiment may specifically include:

a feature obtaining module 10 configured to obtain a user feedback behavior feature of a to-be-recognized article in a news-recommending system;

a recognition module 11 configured to, according to the user feedback behavior feature of the to-be-recognized article obtained by the feature obtaining module 10 and a predetermined low-quality article recognition model, recognize whether the to-be-recognized article is a low-quality article.

Principles employed by the apparatus for recognizing a low-quality article based on artificial intelligence according to the present embodiment to implement recognition of the low-quality article based on artificial intelligence and the resultant technical effects are the same as those of the above-mentioned method embodiments. For particulars, please refer to the depictions of the aforesaid relevant method embodiments, and no detailed depictions will be presented here.

Figure 10:
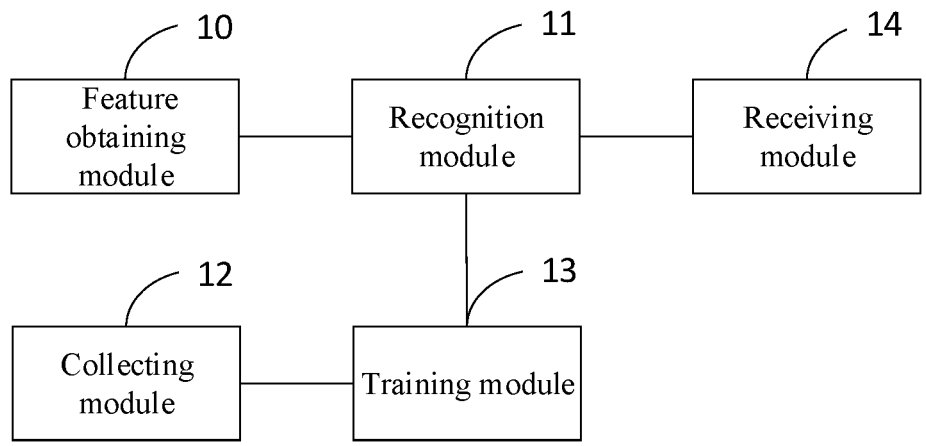
FIG. 10 is a structural schematic diagram of a second embodiment of an apparatus for recognizing a low-quality article based on artificial intelligence according to the present disclosure.

FIG. 10 is a structural schematic diagram of a second embodiment of an apparatus for recognizing a low-quality article based on artificial intelligence according to the present disclosure. As shown in FIG. 10, the apparatus for recognizing a low-quality article based on artificial intelligence according to the present embodiment, on the basis of the embodiment shown in FIG. 9, may further include the following technical solution:

In the apparatus for recognizing a low-quality article based on artificial intelligence according to the present embodiment, the feature obtaining module 10 is further configured to obtain a feature of the to-be-recognized article in the news-recommending system;

The recognition module 11 is specifically configured to recognize whether the to-be-recognized article is a low-quality article, according to the user feedback behavior feature of the to-be-recognized article obtained by the feature obtaining module 10 and a predetermined low-quality article recognition model, and in combination with the feature of the to-be-recognized article obtained by the feature obtaining module 10.

Further optionally, the apparatus for recognizing a low-quality article based on artificial intelligence according to the present embodiment further comprises:

a collecting module 12 configured to collect user feedback behavior features corresponding to respective training articles in several training articles whose known class is a low-quality article or non-low-quality article, as training data to obtain several training data;

a training module 13 configured to, according to the several training data collected by the collecting module 12, train the low-quality article recognition model.

Correspondingly, the recognition module 11 is configured to, according to the user feedback behavior feature of the to-be-recognized article obtained by the feature obtaining module 10 and a low-quality article recognition model predetermined by the training module 13, recognize whether the to-be-recognized article is a low-quality article.

Further optionally, in the apparatus for recognizing a low-quality article based on artificial intelligence according to the present embodiment, each training data further comprises a feature of a corresponding training article.

Further optionally, in the apparatus for recognizing a low-quality article based on artificial intelligence according to the present embodiment, if the user feedback behavior feature of the to-be-recognized article comprises the user's comments, and the low-quality article recognition model comprises a first classifier mode, the recognition module 12 is specifically configured to:

according to the user's comments on the to-be-recognized article and a pre-trained primary low-quality article recognition model, perform a primary prediction about whether the to-be-recognized article is the low-quality article, to obtain a primary prediction result;

perform word-segmenting processing for the user's comments on the to-be-recognized article;

detect situations that segmented words obtained from the word segmenting processing hit subject feature words in a pre-collected subject feature word repository, to obtain a subject feature word expression of the user's comments on the to-be-recognized article, the subject feature words each being a commenting subject which is pre-collected and used to comment on the low-quality article;

detect situations that segmented words obtained from the word segmenting processing hit commentary content feature words in a pre-collected commentary content feature word dictionary, to obtain a commentary content feature word expression of the user's comments on the to-be-recognized article, the commentary content feature words each being a word which is pre-collected and used to comment on the low-quality article;

input a primary prediction result, the subject feature word expression and the commentary content feature word expression into a pre-trained first classifier model, so that the first classifier model predicts whether the to-be-recognized article is the low-quality article.

Further optionally, at this time, correspondingly the training module 13 is specifically configured to:

obtain users' comments on respective training articles, from user feedback behavior features of training articles of said several training data;

regarding users' comments on respective training articles, input corresponding users' comments into a pre-trained primary low-quality article recognition model, so that the primary low-quality article recognition model outputs a primary prediction result of whether a corresponding training article is the low-quality article;

regarding users' comments on each training article, obtain a subject feature word expression corresponding to the users' comments on the corresponding training article, according to the subject feature word repository;

regarding the user's comment on each training article, obtain a commentary content feature word expression corresponding to the users' comments on the corresponding training article, according to the commentary content feature word dictionary;

train the first classifier model by using the primary prediction results, the subject feature word expressions and the commentary content feature word expressions corresponding to the users' comments on respective training articles, and known classes of respective training articles.

Further optionally, the training module 13 is further configured to use users' comments corresponding to respective training articles and known classes of respective training articles, to train the primary low-quality article recognition model;

the training module is specifically configured to input users' comments corresponding to respective training articles in turn into the primary low-quality article recognition model, so that the primary low-quality article recognition model predicts a predicted class of a corresponding training article; judge whether the predicted class of the training article is consistent with the known class; in case of inconsistency, adjust parameters of the primary low-quality article recognition model so that the predicted class of the training article as predicted by the primary low-quality article recognition model tends to be consistent with the known class; according to the above steps, repeatedly use users' comments on respective training articles to train the primary low-quality article recognition model until the primary low-quality article recognition model converges; determine parameters of the primary low-quality article recognition model and thereby determine the primary low-quality article recognition model.

Further optionally, in the apparatus for recognizing a low-quality article based on artificial intelligence according to the present embodiment, if the user feedback behavior feature of the to-be-recognized article includes clicking and opening times and times of clicking dislikes, and the feature of the to-be-recognized article includes displaying times, and the low-quality article recognition model includes a second classifier model, the recognition module 11 is specifically configured to input the clicking and opening times, the times of clicking dislike and the displaying times of the to-be-recognized article into the pre-trained second classifier model, so that the second classifier model predicts whether the to-be-recognized article is the low-quality article.

Further optionally, at this time, correspondingly the training module 13 is specifically configured to:

obtain the clicking and opening times and the times of clicking dislikes of respective training articles, from user feedback behavior features of respective training articles of said several training data; obtain the displaying times of respective training articles from features of respective training articles of said several training data;

train the second classifier model by using the clicking and opening times, the times of clicking dislike, the displaying times and known classes of respective training articles.

Further optionally, in the apparatus for recognizing a low-quality article based on artificial intelligence according to the present embodiment, if the user feedback behavior feature of the to-be-recognized article includes a reading progress and a reading duration, the feature of the to-be-recognized article includes a length of the to-be-recognized article and the number of included pictures, and the low-quality article recognition model includes a third classifier model, the recognition module 11 is specifically configured to input the reading progress and the reading duration of the to-be-recognized article, the length of the to-be-recognized article and the number of included pictures, into the pre-trained third classifier model, so that the third classifier model predicts whether the to-be-recognized article is the low-quality article.

Further optionally, at this time, correspondingly the training module 13 is specifically configured to:

obtain the reading progress and reading duration of respective training articles, from user feedback behavior features of respective training articles of said several training data; obtain the length of the respective training articles and the number of included pictures, from features of respective training articles of said several training data;

train a third classifier model by using the reading progress, reading duration, length and the number of included pictures of the respective training articles, and known classes of the respective training articles.

Further optionally, in the apparatus for recognizing a low-quality article based on artificial intelligence according to the present embodiment, if the user feedback behavior feature of the to-be-recognized article includes times of storing in favorites and sharing times, the feature of the to-be-recognized article includes times of displaying the to-be-recognized article, and the low-quality article recognition model includes a fourth classifier model, the recognition module 11 is specifically configured to input the times of storing in favorites, sharing times and displaying times of the to-be-recognized article, into the pre-trained fourth classifier model, so that the fourth classifier model predicts whether the to-be-recognized article is the low-quality article.

Further optionally, at this time, correspondingly the training module 13 is specifically configured to:

obtain the times of storing in favorites and sharing times of the respective training articles, from user feedback behavior features of respective training articles of said several training data; obtain the displaying times of the respective training articles, from features of respective training articles of said several training data;

train a fourth classifier model by using the times of storing in favorites, the sharing times and the displaying times of the respective training articles, and known classes of the respective training articles.

Further optionally, in the apparatus for recognizing a low-quality article based on artificial intelligence according to the present embodiment, if the low-quality article recognition model includes at least two pre-trained classifier models, the recognition module 11 is specifically configured to:

obtain the classifier models' prediction results about whether the to-be-recognized article is the low-quality article, according to the user feedback behavior feature of the to-be-recognized article, or the user feedback behavior feature of the to-be-recognized article and the feature of the to-be-recognized article, and in combination with the pre-trained classifier models;

predict whether the to-be-recognized article is the low-quality article, according to the classifier models' prediction results about whether the to-be-recognized article is the low-quality article, and predetermined weights of respective classifier models.

Optionally, as shown in FIG. 10, the apparatus for recognizing a low-quality article based on artificial intelligence according to the present embodiment further comprises:

a receiving module 14 configured to receive weights of respective classifier models set by the user.

At this time, correspondingly the recognition module 11 is configured to, according to classifier models' prediction results about whether the to-be-recognized article is the low-quality article, and weights of respective classifier models received by the receiving module 14, predict whether the to-be-recognized article is the low-quality article.

Further optionally, at this time, correspondingly the training module 13 may be specifically configured to:

upon performing the first round of training, according to a sampling probability of respective training data, sample from a training data set D comprised of collected several training data to obtain a training data subset D', D' being a subset of D; an initial sampling probability of the respective training data upon the first round of training being the same;

use respective training data in the training data subset D' to train a plurality of pre-selected classifier models respectively;

according to results of training the plurality of pre-selected classifier models, calculate a training error of the respective classifier models upon the first round of training;

according to the training error of each classifier model, obtain a classifier model with a minimum training error as the first round of classifier model selected by this round of training;

according to the training error of the first round of classifier model, set a weight of the first round of classifier model;

according to training results of the first round of classifier model for the respective training data in the training data subset, update a sampling probability of respective training data in the training data subset, so that the sampling probability of training data with a wrong prediction result upon this round of training increases, whereas the sampling probability of the training data with a correct prediction result reduces;

repeatedly perform the above steps, and perform the second to $N^{th}$ round of training, to respectively obtain the second round of classifier model, . . . the $N^{th}$ round of classifier model, and weights of respective rounds of classifier models.

Principles employed by the apparatus for recognizing a low-quality article based on artificial intelligence according to the present embodiment to implement recognition of the low-quality article based on artificial intelligence and the resultant technical effects are the same as those of the above-mentioned method embodiments. For particulars, please refer to the depictions of the aforesaid relevant method embodiments, and no detailed depictions will be presented here.

Figure 11:
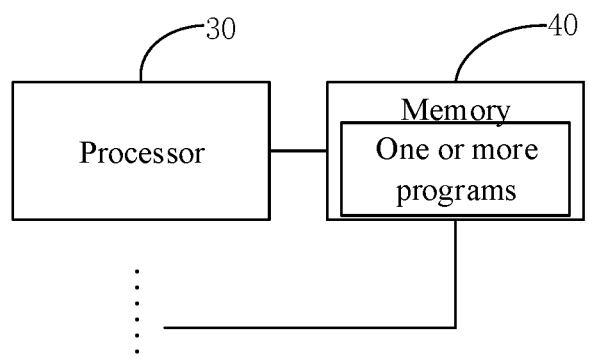
FIG. 11 is a block diagram of an embodiment of a computer device according to the present disclosure.

FIG. 11 is a block diagram of an embodiment of a computer device according to the present disclosure. As shown in FIG. 11, the computer device according to the present embodiment comprises: one or more processors 30, and a memory 40 for storing one or more programs; the one or more programs stored in the memory 40, when executed by said one or more processors 30, enable said one or more processors 30 to implement the method for recognizing a low-quality article based on artificial intelligence shown in FIG. 1-FIG. 8. The embodiment shown in FIG. 11 exemplarily includes a plurality of processors 30.

Figure 12:
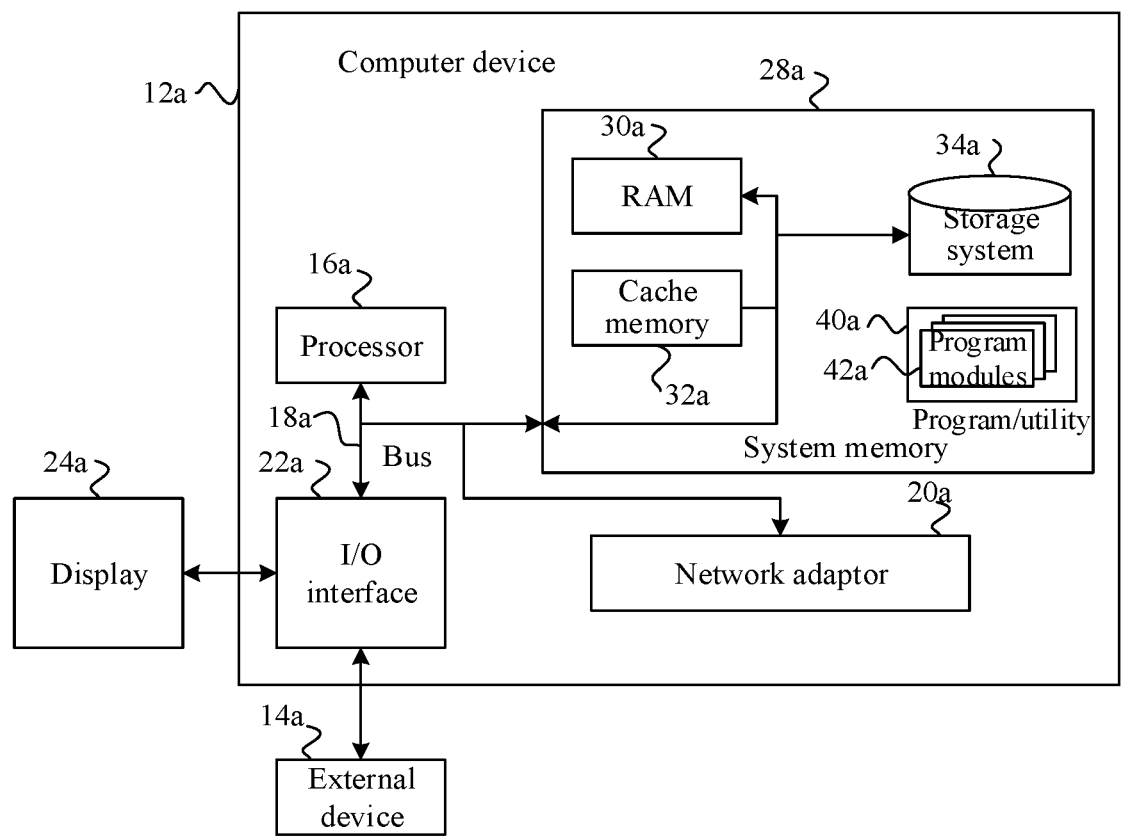
FIG. 12 is an example diagram of a computer device according to an embodiment of the present disclosure.

For example, FIG. 12 is an example diagram of a computer device according to an embodiment of the present disclosure. FIG. 12 shows a block diagram of an example computer device 12*a* adapted to implement an implementation mode of the present disclosure. The computer device 12*a* shown in FIG. 12 is only an example and should not bring about any limitation to the function and scope of use of the embodiments of the present disclosure.

As shown in FIG. 12, the computer device 12*a* is shown in the form of a general-purpose computing device. The components of computer device 12*a* may include, but are not limited to, one or more processors 16*a*, a system memory 28*a*, and a bus 18*a* that couples various system components including the system memory 28*a* and the processors 16*a*.

Bus 18*a* represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12*a* typically includes a variety of computer system readable media. Such media may be any available media that is accessible by computer device 12*a*, and it includes both volatile and non-volatile media, removable and non-removable media.

The system memory 28*a* can include computer system readable media in the form of volatile memory, such as random access memory (RAM) 30*a* and/or cache memory 32*a*. Computer device 12*a* may further include other removable/non-removable, volatile/non-volatile computer system storage media. By way of example only, storage system 34*a* can be provided for reading from and writing to a non-removable, non-volatile magnetic media (not shown in FIG.

12 and typically called a "hard drive"). Although not shown in FIG. 12, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 10 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 10 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 12, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc. The processor 16a executes various function applications and data processing by running programs stored in the system memory 28a, for example, implements the method for recognizing a low-quality article based on artificial intelligence shown in the above embodiments.

The present disclosure further provides a computer readable medium on which a computer program is stored, the program, when executed by the processor, implementing the method for recognizing a low-quality article based on artificial intelligence shown in the above embodiments.

The computer readable medium of the present embodiment may include RAM 30a, and/or cache memory 32a and/or a storage system 34a in the system memory 28a in the embodiment shown in FIG. 12.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A computer-implemented method for recognizing a low-quality article based on artificial intelligence, wherein the method comprises:
    obtaining a user feedback behavior feature of a to-be-recognized article in a news-recommending system, the user feedback behavior feature being in multiple forms and comprising user's comments and non-user's comments which refer to user feedback other than the user's comments;
    according to the user feedback behavior feature of the to-be-recognized article and a predetermined low-quality article recognition model, recognizing whether the to-be-recognized article is a low-quality article, the predetermined low-quality article recognition model comprising a plurality of classifiers, each of which corresponding to one of the user feedback behavior feature;
    wherein the recognizing whether the to-be-recognized article is the low-quality article comprising:
    performing a primary prediction about whether the to-be-recognized article is the low-quality article using the user's comments on the to-be-recognized article and a pre-trained primary low-quality article recognition model, to obtain a primary prediction result,
        wherein the user's comment of a negative comment comprises identifying and collecting the subject feature word expression associated with a quality or an author of the article to obtain a first subject feature word expression, and filtering out the subject feature word expression associated with an event or an entity in the article so that the negative comment on the quality or the author of the article is distinguished from the negative comment on the event or the entity in the article, wherein the event or the entity relates to the content contained in the article,
        wherein the primary prediction result and the first subject feature word expression are provided as inputs into a first classifier model of the plurality of classifiers to predict whether the to-be-recognized article is the low-quality article;
    processing the corresponding user feedback behavior feature using each of the plurality of classifiers to obtain a prediction result of the respective classifiers, the prediction result comprising respective results of giving up vote; and
    predicting whether the to-be-recognized article is the low-quality article, according to the prediction result of the respective classifiers and respective predetermined weights of the respective classifiers.

2. The method according to claim 1, wherein the method further comprises:
    obtaining a feature of the to-be-recognized article in the news-recommending system;
    correspondingly, the step of, according to the user feedback behavior feature of the to-be-recognized article and the predetermined low-quality article recognition model, recognizing whether the to-be-recognized article is the low-quality article specifically further comprises:
    recognizing whether the to-be-recognized article is the low-quality article, according to the user feedback behavior feature of the to-be-recognized article and the predetermined low-quality article recognition model, and in combination with the feature of the to-be-recognized article.

3. The method according to claim 2, wherein before the step of, according to the user feedback behavior feature of the to-be-recognized article and the predetermined low-quality article recognition model, recognizing whether the to-be-recognized article is the low-quality article, the method further comprises:
    collecting user feedback behavior features corresponding to respective training articles in several training articles whose known class is the low-quality article or a non-low-quality article, as training data to obtain several training data; and
    training the predetermined low-quality article recognition model according to the several training data.

4. The method according to claim 3, wherein each training data further comprises a feature of a corresponding training article.

5. The method according to claim 3, wherein responsive to the user feedback behavior feature of the to-be-recognized article comprises the user's comments, and the predetermined low-quality article recognition model comprises the first classifier model, the step of recognizing whether the to-be-recognized article is the low-quality article according to the user feedback behavior feature and the predetermined low-quality article recognition model specifically comprises:
    performing word-segmenting processing for the user's comments on the to-be-recognized article;
    detecting situations that segmented words obtained from the word segmenting processing hit subject feature words in a pre-collected subject feature word repository, to obtain a subject feature word expression of the user's comments on the to-be-recognized article; the subject feature words each being a commenting subject which is pre-collected and used to comment on the low-quality article; and
    detecting situations that segmented words obtained from the word segmenting processing hit commentary content feature words in a pre-collected commentary content feature word dictionary, to obtain a commentary content feature word expression of the user's comments on the to-be-recognized article, the commentary content feature words each being a word which is pre-collected and used to comment on the low-quality article.

6. The method according to claim 5, wherein the training the predetermined low-quality article recognition model according to the several training data specifically comprises:

obtaining user's comments on respective training articles, from user feedback behavior features of training articles of said several training data;

regarding user's comments on respective training articles, inputting corresponding user's comments into the pre-trained primary low-quality article recognition model, so that the primary low-quality article recognition model outputs the primary prediction result of whether a corresponding training article is the low-quality article;

regarding the user's comments on each training article, obtaining the subject feature word expression corresponding to the user's comments on the corresponding training article, according to the subject feature word repository;

regarding the user's comment on each training article, obtaining the commentary content feature word expression corresponding to the user's comments on the corresponding training article, according to the commentary content feature word dictionary; and training the first classifier model by using the primary prediction results, the subject feature word expressions and the commentary content feature word expressions corresponding to the user's comments on respective training articles, and known classes of respective training articles.

7. The method according to claim 6, wherein before the step of, regarding user's comments on respective training articles, inputting corresponding user's comments into the pre-trained primary low-quality article recognition model, so that the primary low-quality article recognition model outputs the primary prediction result of whether the corresponding training article is the low-quality article, the method further comprises:

using user's comments corresponding to respective training articles and known classes of respective training articles, to train the primary low-quality article recognition model;

the using user's comments corresponding to respective training articles and known classes of respective training articles, to train the primary low-quality article recognition model specifically comprises:

inputting user's comments corresponding to respective training articles in turn into the primary low-quality article recognition model, so that the primary low-quality article recognition model predicts a predicted class of the corresponding training article; judging whether the predicted class of the training article is consistent with the known class; in case of inconsistency, adjusting parameters of the primary low-quality article recognition model so that the predicted class of the training article as predicted by the primary low-quality article recognition model tends to be consistent with the known class; according to the above steps, repeatedly using user's comments on respective training articles to train the primary low-quality article recognition model until the primary low-quality article recognition model converges; determining parameters of the primary low-quality article recognition model and thereby determining the primary low-quality article recognition model.

8. The method according to claim 4, wherein responsive to the user feedback behavior feature of the to-be-recognized article includes clicking and opening times and times of clicking dislikes, and the feature of the to-be-recognized article includes displaying times, and the predetermined low-quality article recognition model includes a second classifier model, the step of recognizing whether the to-be-recognized article is the low-quality article, according to the user feedback behavior feature and the predetermined low-quality article recognition model, and in combination with the feature of the to-be-recognized article, specifically comprises:

inputting the clicking and opening times, the times of clicking dislike and the displaying times of the to-be-recognized article into the pre-trained second classifier model, so that the second classifier model predicts whether the to-be-recognized article is the low-quality article.

9. The method according to claim 8, wherein the training the predetermined low-quality article recognition model according to the several training data specifically comprises:

obtaining the clicking and opening times and the times of clicking dislikes of respective training articles, from user feedback behavior features of respective training articles of said several training data; obtaining the displaying times of respective training articles from features of respective training articles of said several training data; and training the second classifier model by using the clicking and opening times, the times of clicking dislike, the displaying times and known classes of respective training articles.

10. The method according to claim 4, wherein responsive to the user feedback behavior feature of the to-be-recognized article includes a reading progress and a reading duration, the feature of the to-be-recognized article includes a length of the to-be-recognized article and a number of included pictures, and the predetermined low-quality article recognition model includes a third classifier model, the step of recognizing whether the to-be-recognized article is the low-quality article, according to the user feedback behavior feature and the predetermined low-quality article recognition model, and in combination with the feature of the to-be-recognized article, specifically comprises:

inputting the reading progress and the reading duration of the to-be-recognized article, the length of the to-be-recognized article and the number of included pictures, into the pre-trained third classifier model, so that the third classifier model predicts whether the to-be-recognized article is the low-quality article.

11. The method according to claim 10, wherein the training the predetermined low-quality article recognition model according to the several training data specifically comprises:

obtaining the reading progress and reading duration of respective training articles, from user feedback behavior features of respective training articles of said several training data; obtaining the length of the respective training articles and the number of included pictures, from features of respective training articles of said several training data; and training the third classifier model by using the reading progress, reading duration, length and the number of included pictures of the respective training articles, and known classes of the respective training articles.

12. The method according to claim 4, wherein responsive to the user feedback behavior feature of the to-be-recognized article includes times of storing in favorites and sharing times, the feature of the to-be-recognized article includes times of displaying the to-be-recognized article, and the predetermined low-quality article recognition model includes a fourth classifier model, the step of recognizing whether the to-be-recognized article is the low-quality article, according to the user feedback behavior feature and the predetermined low-quality article recognition model, and in combination with the feature of the to-be-recognized article, specifically comprises:

inputting the times of storing in favorites, the sharing times and the displaying times of the to-be-recognized article, into the pre-trained fourth classifier model, so that the fourth classifier model predicts whether the to-be-recognized article is the low-quality article.

13. The method according to claim 12, wherein the training the predetermined low-quality article recognition model according to the several training data specifically comprises:

obtaining the times of storing in favorites and the sharing times of the respective training articles, from user feedback behavior features of respective training articles of said several training data; obtaining the displaying times of the respective training articles, from features of respective training articles of said several training data; and training the fourth classifier model by using the times of storing in favorites, the sharing times and the displaying times of the respective training articles, and known classes of the respective training articles.

14. The method according to claim 4, wherein responsive to the predetermined low-quality article recognition model includes at least two pre-trained classifier models, the step of recognizing whether the to-be-recognized article is the low-quality article, according to the user feedback behavior feature and the predetermined low-quality article recognition model, and in combination with the feature of the to-be-recognized article, specifically comprises:

according to the user feedback behavior feature of the to-be-recognized article, or the user feedback behavior feature of the to-be-recognized article and the feature of the to-be-recognized article, and in combination with the at least two pre-trained classifier models, obtaining the respective classifier models' prediction results about whether the to-be-recognized article is the low-quality article; and predicting whether the to-be-recognized article is the low-quality article, according to the respective classifier models' prediction results about whether the to-be-recognized article is the low-quality article, and predetermined weights of respective classifier models.

15. The method according to claim 14, wherein before predicting whether the to-be-recognized article is the low-quality article, according to the respective classifier models' prediction results about whether the to-be-recognized article is the low-quality article, and predetermined weights of respective classifier models, the method further comprises:

receiving weights of respective classifier models set by the user.

16. The method according to claim 14, wherein the training the predetermined low-quality article recognition model according to the several training data specifically comprises:

upon performing a first round of training, according to a sampling probability of respective training data, sampling from a training data set D comprised of collected several training data to obtain a training data subset D', D' being a subset of D; an initial sampling probability of the respective training data upon the first round of training being the same;

using respective training data in the training data subset D' to train a plurality of pre-selected classifier models respectively;

according to results of training the plurality of pre-selected classifier models, calculating a training error of the respective classifier models upon the first round of training;

according to the training error of each of said classifier models, obtaining a classifier model with a minimum training error as the first round of classifier model selected by this round of training;

according to the training error of the first round of classifier model, setting a weight of the first round of classifier model;

according to training results of the first round of classifier model for the respective training data in the training data subset, updating the sampling probability of respective training data in the training data subset, so that the sampling probability of training data with a wrong prediction result upon this round of training increases, whereas the sampling probability of training data with a correct prediction result reduces; and repeatedly performing the above steps, and performing a second to $N^{th}$ round of training, to respectively obtain the second round of classifier model, . . . the $N^{th}$ round of classifier model, and weights of respective rounds of classifier models.

17. A computer device, wherein the device comprises:
one or more processors,
a memory for storing one or more programs,
the one or more programs, when executed by said one or more processors, enable said one or more processors to implement a method for recognizing a low-quality article based on artificial intelligence, wherein the method comprises:

obtaining a user feedback behavior feature of a to-be-recognized article in a news-recommending system, the user feedback behavior feature being in multiple forms and comprising user's comments and non-user's comments which refer to user feedback other than the user's comments;

according to the user feedback behavior feature of the to-be-recognized article and a predetermined low-quality article recognition model, recognizing whether the to-be-recognized article is a low-quality article, the predetermined low-quality article recognition model comprising a plurality of classifiers, each of which corresponding to one of the user feedback behavior feature;

wherein the recognizing whether the to-be-recognized article is the low-quality article comprising:

performing a primary prediction about whether the to-be-recognized article is the low-quality article using the user's comments on the to-be-recognized article and a pre-trained primary low-quality article recognition model, to obtain a primary prediction result, wherein the user's comment of a negative comment comprises identifying and collecting the subject feature word expression associated with a quality or an author of the article to obtain a first subject feature word expression, and filtering out the subject feature word expression associated with an event or an entity in the article so that the negative comment on the quality or the author of the article is distinguished from the negative comment on the event or the entity in the article, wherein the event or the entity relates to the content contained in the article, wherein the primary prediction result and the first subject feature word expression are provided as inputs into a first classifier model of the plurality of classifiers to predict whether the to-be-recognized article is the low-quality article;
processing the corresponding user feedback behavior feature using each of the plurality of classifiers to obtain a prediction result of the respective classifiers, the prediction result comprising respective results of giving up vote; and
predicting whether the to-be-recognized article is the low-quality article, according to the prediction result of the respective classifiers and respective predetermined weights of the respective classifiers.

18. The computer device according to claim 17, wherein the method further comprises:
obtaining a feature of the to-be-recognized article in the news-recommending system;
correspondingly, the step of, according to the user feedback behavior feature of the to-be-recognized article and the predetermined low-quality article recognition model, recognizing whether the to-be-recognized article is the low-quality article specifically further comprises:
recognizing whether the to-be-recognized article is the low-quality article, according to the user feedback behavior feature of the to-be-recognized article and the predetermined low-quality article recognition model, and in combination with the feature of the to-be-recognized article.

19. The computer device according to claim 18, wherein before the step of, according to the user feedback behavior feature of the to-be-recognized article and the predetermined low-quality article recognition model, recognizing whether the to-be-recognized article is the low-quality article, the method further comprises:
collecting user feedback behavior features corresponding to respective training articles in several training articles whose known class is the low-quality article or a non-low-quality article, as training data to obtain several training data; and
training the predetermined low-quality article recognition model according to the several training data.

20. A non-transitory computer readable medium on which a computer program is stored, wherein the program, when executed by a processor, implements a method for recognizing a low-quality article based on artificial intelligence, wherein the method comprises:
obtaining a user feedback behavior feature of a to-be-recognized article in a news-recommending system, the user feedback behavior feature being in multiple forms and comprising user's comments and non-user's comments which refer to user feedback other than the user's comments;
according to the user feedback behavior feature of the to-be-recognized article and a predetermined low-quality article recognition model, recognizing whether the to-be-recognized article is a low-quality article, the predetermined low-quality article recognition model comprising a plurality of classifiers, each of which corresponding to one of the user feedback behavior feature;
wherein the recognizing whether the to-be-recognized article is the low-quality article comprising:
performing a primary prediction about whether the to-be-recognized article is the low-quality article using the user's comments on the to-be-recognized article and a pre-trained primary low-quality article recognition model, to obtain a primary prediction result,
wherein the user's comment of a negative comment comprises identifying and collecting the subject feature word expression associated with a quality or an author of the article to obtain a first subject feature word expression, and filtering out the subject feature word expression associated with an event or an entity in the article so that the negative comment on the quality or the author of the article is distinguished from the negative comment on the event or the entity in the article, wherein the event or the entity relates to the content contained in the article,
wherein the primary prediction result and the first subject feature word expression are provided as inputs into a first classifier model of the plurality of classifiers to predict whether the to-be-recognized article is the low-quality article;
processing the corresponding user feedback behavior feature using each of the plurality of classifiers to obtain a prediction result of the respective classifiers, the prediction result comprising respective results of giving up vote; and
predicting whether the to-be-recognized article is the low-quality article, according to the prediction result of the respective classifiers and respective predetermined weights of the respective classifiers.

* * * * *